(12) United States Patent
Abrol et al.

(10) Patent No.: US 12,551,526 B2
(45) Date of Patent: Feb. 17, 2026

(54) ENTERICALLY DELIVERED BITTER OLIGOPEPTIDES FOR THE TREATMENT FOR TYPE 2 DIABETES

(71) Applicant: Cedars-Sinai Medical Center, Los Angeles, CA (US)

(72) Inventors: Ravinder Abrol, Arcadia, CA (US); Stephen J. Pandol, Los Angeles, CA (US); Hung Pham, Santa Monica, CA (US)

(73) Assignee: Cedars-Sinai Medical Center, Los Angeles, CA (US)

( * ) Notice: Subject to any disclaimer, the term of this patent is extended or adjusted under 35 U.S.C. 154(b) by 0 days.

(21) Appl. No.: 15/566,172

(22) PCT Filed: Apr. 22, 2016

(86) PCT No.: PCT/US2016/028841
§ 371 (c)(1),
(2) Date: Oct. 12, 2017

(87) PCT Pub. No.: WO2016/172479
PCT Pub. Date: Oct. 27, 2016

(65) Prior Publication Data
US 2018/0110823 A1 Apr. 26, 2018

Related U.S. Application Data

(60) Provisional application No. 62/151,306, filed on Apr. 22, 2015.

(51) Int. Cl.
| | | |
|---|---|---|
| *A61K 38/00* | (2006.01) | |
| *A61K 31/19* | (2006.01) | |
| *A61K 31/366* | (2006.01) | |
| *A61K 31/37* | (2006.01) | |
| *A61K 38/06* | (2006.01) | |
| *A61K 38/07* | (2006.01) | |
| *A61K 38/08* | (2019.01) | |
| *A61K 38/26* | (2006.01) | |
| *A61K 38/28* | (2006.01) | |
| *A61K 45/06* | (2006.01) | |
| *A61K 47/61* | (2017.01) | |
| *A61P 3/04* | (2006.01) | |
| *A61P 3/10* | (2006.01) | |
| *G01N 33/50* | (2006.01) | |

(52) U.S. Cl.
CPC ............ *A61K 38/08* (2013.01); *A61K 31/19* (2013.01); *A61K 31/366* (2013.01); *A61K 31/37* (2013.01); *A61K 38/06* (2013.01); *A61K 38/07* (2013.01); *A61K 38/26* (2013.01); *A61K 38/28* (2013.01); *A61K 45/06* (2013.01); *A61K 47/61* (2017.08); *A61P 3/04* (2018.01); *A61P 3/10* (2018.01); *G01N 33/5041* (2013.01); *A61K 2300/00* (2013.01)

(58) Field of Classification Search
CPC ........ A61K 38/08; A61K 38/06; A61K 38/07; A61K 38/26; A61K 38/28; A61P 3/04; A61P 3/10
See application file for complete search history.

(56) References Cited

U.S. PATENT DOCUMENTS

| | | | |
|---|---|---|---|
| 6,777,388 B1 * | 8/2004 | Grasso | A61K 48/00 514/4.8 |
| 8,710,003 B2 | 4/2014 | Reimer et al. | |
| 8,796,223 B2 | 8/2014 | Zacks | |
| 9,308,259 B2 | 4/2016 | Epshtein et al. | |
| 2004/0009956 A1 | 1/2004 | Pei et al. | |
| 2005/0107450 A1 | 5/2005 | Brown et al. | |
| 2006/0094011 A1 | 5/2006 | Morris et al. | |
| 2006/0216330 A1 | 9/2006 | Janssen et al. | |
| 2008/0261824 A1 | 10/2008 | Moyer et al. | |
| 2010/0197605 A1 * | 8/2010 | Bevec | A23C 9/1526 514/6.9 |
| 2010/0297253 A1 * | 11/2010 | Reimer | A23J 1/20 424/535 |
| 2011/0008452 A1 | 1/2011 | Epshtein et al. | |
| 2011/0082079 A1 * | 4/2011 | Spetzler | A61P 43/00 530/399 |
| 2012/0164243 A1 | 6/2012 | Rinsch et al. | |
| 2013/0102581 A1 | 4/2013 | Szewczyk | |
| 2014/0120120 A1 * | 5/2014 | Woo | A61K 38/28 424/179.1 |
| 2014/0271554 A1 | 9/2014 | Dirk et al. | |
| 2014/0271555 A1 | 9/2014 | Dirk et al. | |

FOREIGN PATENT DOCUMENTS

| | | |
|---|---|---|
| CN | 103596595 A | 2/2014 |
| CN | 107708718 A | 2/2018 |

(Continued)

OTHER PUBLICATIONS

Dotson (Bitter Taste Receptors Influence Glucose Homeostasis, PLoS One 2008, 3(12)). (Year: 2008).*

(Continued)

*Primary Examiner* — Jeanette M Lieb
(74) *Attorney, Agent, or Firm* — Nixon Peabody LLP; Suwei Zhu; Linda B. Huber

(57) ABSTRACT

Described herein are methods and compositions for treatment of diabetes and/or obesity. Bitter oligopeptide molecules formulated for enteric delivery modulate signals involving receptors facing the lumen of the gastrointestinal tract, said signaling related hormones such as glucagon-like peptide-1 (GLP-1) and peptide tyrosine-tyrosine (PYY) that involve inhibition of gastric emptying and appetite. As a novel way to treat diabetes with limited adverse effects the described invention uses body's own endocrine system to treat diabetes, which is an advantage over current therapies that may simply provide disease management without cure or require more radical approaches such as surgical intervention.

23 Claims, 10 Drawing Sheets
Specification includes a Sequence Listing.

(56) References Cited

FOREIGN PATENT DOCUMENTS

| EP | 3285795 | 2/2018 |
| IN | 20171703944 A | 12/2017 |
| WO | 2014/150563 A1 | 9/2014 |
| WO | 2014/150571 A1 | 9/2014 |
| WO | 2015026245 A1 | 2/2015 |
| WO | 2016172479 A1 | 10/2016 |

OTHER PUBLICATIONS

Dotson (Bitter Taste Receptors Influence Glucose Homeostasis, PLoS One 2008, 3(12), of record) (Year: 2008).*

Cai et al, Synthesis and anaerobic biodegradation of indomethacin-conjugated cellulose ethers used for colon-specific drug delivery, Bioresource Technology 100 (2009) 4164-4170 (Year: 2009).*

Hernandez-Ledesma et al. Effect of simulated gastrointestinal digestion on the antihypertensive properties of synthetic b-lactoglobulin peptide sequences, Journal of Dairy Research (2007) 74 336-339.*

International Search Report and Written Opinion for PCT/US2016/028841, dated Sep. 30, 2016, 16 pages.

Dotson et al., Bitter Taste Receptors Influence Glucose Homeostasis, PLoS One, 2008, vol. 3(12), pp. 1-10.

Dotson et al., T1R and T2R Receptors: The Modulcation of Incretin Hormones and Potential Targets for the Treatment of Type 2 Diabetes Mellitus, Curr. Opin. Investig. Drugs, 2010, vol. 11(4), pp. 447-454.

Liu et al., Identification of Bitter Peptides in Whey Protein Hydrolysate, J. Agric. Food Chem., 2014, vol. 62(25), pp. 5719-5725.

International Preliminary Report on Patentability for PCT/US2016/028841, dated Nov. 2, 2017, 12 pages.

Partial Supplementary European Search Report of EP 16783939.8, dated Oct. 17, 2018, 14 Pages.

Extended European Search Report of EP 16783939.8, dated Jan. 23, 2019, 14 Pages.

Bringer et al., Is There a Place for Bariatric Surgery in Diabetes Treatment?, Diabetes & Metabolism, 2009, vol. 35(2), pp. 1-77.

Hernandez-Ledesma et al., Dairy protein hydrolysates: Peptides for health benefits, 2013, vol. 38, pp. 82-100.

Janssen et al., Nutrient Sensing in the Gut: New Roads to Therapeutics?, Trends in Endocrinology and Metabolism, 2013, vol. 24(2), pp. 92-100.

Pham et al., A Bitter Pill for Type 2 Diabetes? The Activation of Bitter Taste Receptor TAS2R38 can Stimulate GLP-1 Release from Enteroendocrine L-Cells, Biochem Biophys Res Commun, 2016, vol. 475(3), pp. 295-300.

Brandelli et al., Whey as a source of peptides with remarkable biological activities, Food Research International, 2015, vol. 73, pp. 149-161.

Oseguera-Toledo et al., Proteins and Bioactive Peptides, Nutrafoods, 2015, vol. 13, pp. 147-157.

Bufe et al., The Molecular Basis of Individual Differences in Phenylthiocarbamide and Propylthiouracil Bitterness Perception, Current Biology, 2005, vol. 15, pp. 322-327.

Kim et al., Positional Cloning of the Human Quantitative Trait Locus Underlying Taste Sensitivity to Phenylthiocarbamide, Science, vol. 299, 2003, pp. 1221-1225.

Tan et al., 3D Structure Prediction of TAS2R38 Bitter Receptors Bound to Agonists Phenylthiocarbamide (PTC) and 6-n-Propylthiouracil (PROP), Journal of Chemical Information and Modeling, 2012, vol. 52, pp. 1875-1885.

Jang et al., Gut-expressed gustducin and taste receptors regulate secretion of glucagon-like peptide-1, PNAS, 2007, vol. 104, (38), pp. 15069-15074.

Lan et al., Agonists at GPR119 mediate secretion of GLP-1 from mouse enteroendocrine cells through glucose-independent pathways, British Journal of Pharmacology, 2012, vol. 165, pp. 2799-2807.

Soares et al., Different Phenolic Compounds Activate Distinct Human Bitter Taste Receptors, Journal of Agricultural and Food Chemistry, 2013, vol. 61, pp. 1525-1533.

Wooding et al., Natural Selection and Molecular Evolution in PTC, a Bitter-Taste Receptor Gene, Am. J. Hum. Genet., 2004, vol. 74, pp. 637-646.

Abrol et al., BiHelix: Towards de novo Structure Prediction of an Ensemble of G-Protein Coupled Receptor Conformations, Proteins, 2012, vol. 80(2), pp. 505-518.

Abrol et al., Structure Prediction of G Protein-Coupled Receptors and Their Ensemble of Functionally Important Conformations, Methods in Molecular Biology, 2012, vol. 914, pp. 237-254.

Bray et al., SuperBiHelix method for predicting the pleiotropic ensemble of G-protein-coupled receptor conformations, PNAS, 2013, pp. E72-E78.

\* cited by examiner

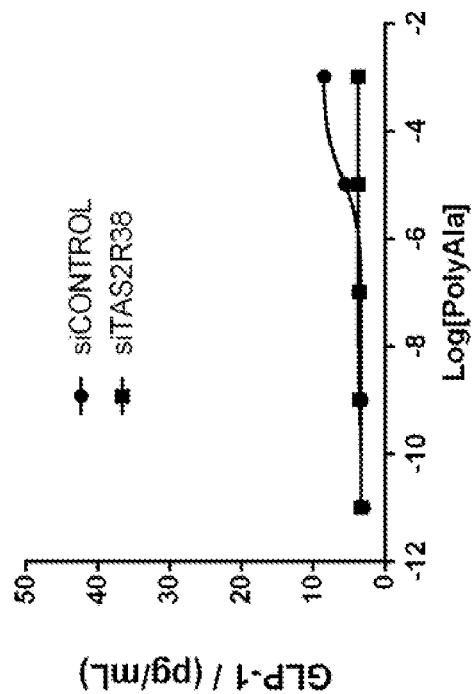
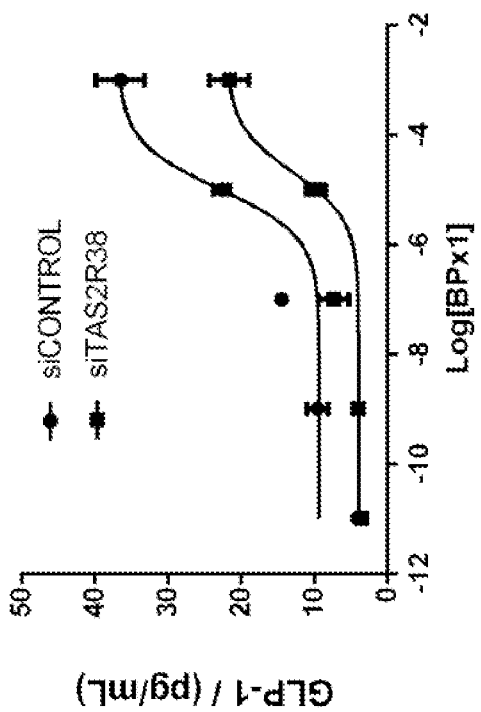
FIG. 11A
FIG. 11B

ENTERICALLY DELIVERED BITTER OLIGOPEPTIDES FOR THE TREATMENT FOR TYPE 2 DIABETES

CROSS-REFERENCE TO RELATED APPLICATIONS

This application is a National Phase of International Application No. PCT/US2016/028841 filed Apr. 22, 2016, currently pending, which designated the U.S. and that International Application was published under PCT Article 21 (2) in English, which also includes a claim of priority under 35 U.S.C. § 119 (e) to U.S. provisional patent application No. 62/151,306 filed Apr. 22, 2015, now expired, the entirety of which is hereby incorporated by reference.

FIELD OF THE INVENTION

The invention relates to compositions and methods for treating diabetes.

BACKGROUND

All publications herein are incorporated by reference to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

On its surface, the GI tract epithelium is endowed with molecular sensing machinery that detects dietary constituents as well as gut microbial metabolites. Many types of the enteroendocrine cells have been identified and they are classified for the most part by their specific contents of endocrine transmitters. Some key examples include enteroendocrine I cells containing cholecystokinin (CCK); and L cells containing glucagon-like peptide-1 (GLP-1) and peptide tyrosine-tyrosine (PYY). The release of these agents into the blood results from interaction of sensors on the cells' lumenal surface to nutrient or environmental factors in the contents of the intestine. Each has specific and necessary functions on gastrointestinal tract responses including local and systemic metabolism.

GLP-1 is derived from the transcription product of the pro-glucagon gene. The biologically active forms of GLP-1 are: GLP-1-(7-37) and GLP-1-(7-36)$NH_2$. Once in the circulation, GLP-1 has a half-life of less than 2 minutes due to rapid degradation by the enzyme dipeptidyl peptidase-4 (DPP4). It is a potent anti-hyperglycemic hormone, inducing glucose-dependent stimulation of insulin secretion while suppressing glucagon secretion. Such glucose-dependent action is particularly attractive because when the plasma glucose concentration is in the normal fasting range, GLP-1 no longer stimulates insulin to cause hypoglycemia. GLP-1 restores the glucose sensitivity of pancreatic β-cells, using a mechanism involving the increased expression of GLUT2 and glucokinase. GLP-1 also inhibits pancreatic β-cell apoptosis, stimulates the proliferation and differentiation of insulin-secreting β-cells, and inhibits gastric secretion and motility. This delays gastric emptying which promotes satiety and weight loss. In fact, GLP-1 analogs as well as inhibitors of endogenous GLP-1 degradation have been developed that have demonstrated efficacy for treatment of type II diabetes mellitus, which is the type associated with obesity. Not only have the analogs been demonstrated to significantly improve insulin secretion and glucose control, they have been found to decrease gastric emptying and increase satiety resulting in weight loss-benefits. L-cells also release two circulating forms of PYY: PYY1-36 and PYY3-36. The latter form is considered the predominant one in both fasted and fed states and is produced by the cleavage of the N-terminal Tyr-Pro residues from PYY1-36 by peptidase enzyme DPP4. PYY inhibits food intake via PYY-2 receptors expressed in neurons of the arcuate nucleus of the hypothalamus. Other actions of PYY include slowing of gastric emptying and slowing small intestine motility.

There has been an explosion of studies using animal and human models aimed at probing the fundamental mechanistic roles of nutrient sensing receptors in the gut. These studies have identified taste receptors (sweet, umami, and bitter) as well as fatty acid receptors (activated by a broad range of chain lengths in the fatty acids) in various enteroendocrine cells. Sweet and umami taste receptors are most likely sensing or tasting energy nutrients and amino acids in the food, whereas the bitter taste receptors are potentially sensing or tasting any harmful and toxic constituents in the food. Once these food components are sensed, several metabolic pathways are activated. In the case of bitter sensing components, pathways that slow down gastric emptying and food absorption are likely activated. Many of these associations are not very well characterized especially in the context of human physiology and are being slowly uncovered. Several studies have shown that release of GLP-1 or other hormones like PYY, CCK, and ghrelin can be effected by activating one of these sensors. These associations are critical to understand the detailed role of these gustatory gut sensors in food digestion.

Physiologic roles for the peptide hormones released from the enteroendocrine cells lining the lumen of the GI tract have been known for some time, but the mechanisms underlying the "sensing" and secretion of the hormones by intestinal contents were not known. Findings are now emerging that taste receptors previously thought to be restricted to the tongue epithelium also are present in the in the stomach, small intestine and colon. Several enteroendocrine cell types express TAS2R-family bitter taste receptors and T1R2/3 sweet taste receptors. In fact, the enteroendocrine cells secrete GLP-1, peptide YY (PYY) or CCK in response to bitter ligands like phenylthiocarbamide (PTC), which is a specific activator of the bitter taste receptor TAS2R38 and denatonium, which activates the bitter taste receptor TAS2R47.

To understand the nutrient mediated signaling of L cells in the context of peptide hormone release, the inventors focused on a bitter taste receptor TAS2R38 to investigate its mechanistic role in the release of the GLP-1 hormone from L-cells. The inventors have identified four bitter oligopeptides (BPx1, BPx2, BPx3 and BPx4) derived from milk-whey proteins that may be used as therapeutic agents in patients with type 2 diabetes.

SUMMARY

The following embodiments and aspects thereof are described and illustrated in conjunction with systems, compositions and methods which are meant to be exemplary and illustrative, not limiting in scope.

Provided herein are methods for method of treating, inhibiting, reducing the severity of, slowing progression of and/or promoting prophylaxis of diabetes and/or obesity in a subject in need thereof. The methods include providing an agent that increases gut hormone release and administering an effective amount of the composition to a subject in need thereof, so as to treat, inhibit, reduce the severity of, slow progression of and/or promote prophylaxis of diabetes and/or obesity in the subject. In one embodiment, diabetes is type 2 diabetes mellitus.

In some embodiments, the gut hormone is any one or more of glucagon-peptide-1 (GLP-1), peptide tyrosine-tyrosine (PYY) or a combination thereof. In some embodiments, GLP-1 is any one or more of GLP-1-(7-37), GLP-1-(7-36) NH2 or a combination thereof.

In some embodiments of the methods, the agent is one or more bitter oligopeptides. In exemplary embodiments, the bitter oligopeptides comprise, consist essentially of or consist of any one or more of YGLF (SEQ ID NO:1), YPFPGPIPN (SEQ ID NO:2), IPAVF (SEQ ID NO: 3), LLF (SEQ ID NO:4), a combination thereof or an analog, pharmaceutical equivalent or a peptidomimetic thereof.

In an embodiment, the bitter oligopeptides are conjugated to an agent to increase intestinal retention. In some exemplary embodiments, the agent to increase intestinal retention is any one or more of cellulose, fatty acids, polyethylene glycol (PEG) or combinations thereof.

In some embodiments, the methods described herein further comprise providing a fatty acid or botanical molecule derived from food that increases gut hormone release. In exemplary embodiments, fatty acid or botanical molecule derived from food include but are not limited to any one or more of urolithin A, ellagic acid, ursolic acid, oleanolic acid, 6-m-propyl-2-thiouracil, propionic acid, butyrate, palmitic acid or a combination thereof.

In various embodiments of the methods described herein, the increase in gut hormone release is mediated by a G-protein coupled receptor (GPCR), wherein the GPCR is expressed on the surface of an endocrine L-cell. In some embodiments, the GPCRs are any one or more of SSTR2, TAS2R38, TAS2R39, TAS2R46, TAS2R47, FFAR1, FFAR2, FFAR4 or FFAR4.

In various embodiments of the methods, the composition is administered orally, enterically to the small intestine or to the colon by rectal suppository or enema. In one embodiment, the subject is human.

In various embodiments, the methods described herein further comprise administering any one or more of SGLT2 inhibitors, insulin, inhaled insulin, sulfonyl ureas, metformin, acarbose, thiazolidinediones or combinations thereof.

In some embodiments, the effective amount of the agent is about 0.1 to 0.5 mg/kg/day, 0.5 to 5 mg/kg/day, 5 to 10 mg/kg/day, 10 to 20 mg/kg/day, 20 to 50 mg/kg/day, 50 to 100 mg/kg/day, 100 to 200 mg/kg/day, 200 to 300 mg/kg/day, 300 to 400 mg/kg/day, 400 to 500 mg/kg/day, 500 to 600 mg/kg/day, 600 to 700 mg/kg/day, 700 to 800 mg/kg/day, 800 to 900 mg/kg/day or 900 to 1000 mg/kg/day. The composition may be administrated to the subject before, during, or after the subject develops diabetes and/or obesity. In some embodiments, the composition is administrated to the subject 1-3 times per day or 1-7 times per week. In some embodiments, the composition is administrated to the subject for 1-5 days, 1-5 weeks, 1-5 months, or 1-5 years.

In various embodiments, the agent that increases release of gut hormones and the fatty acid are administered sequentially or simultaneously.

Also provided herein are pharmaceutical compositions comprising one or more bitter oligopeptides and a pharmaceutically acceptable carrier. In some embodiments, the bitter oligopeptide stimulates release of glucagon-like peptide-1 (GLP-1), peptide tyrosine tyrosine (PYY) or a combination thereof. In some embodiments, the release of GLP-1, PYY or a combination thereof is mediated by G-protein coupled receptor (GPCR) signaling. In some embodiments, the GPCR comprises one or more of TAS2R38, TAS2R39, TAS2R46, TAS2R47, FFAR1, FFAR2, FFAR4 or FFAR4, SSTR2. In some embodiments, the bitter oligopeptides comprises one or more of YGLF, YPFPGPIPN, IPAVF, LLF, a combination thereof or an analog, pharmaceutical equivalent or a peptidomimetic thereof. In some embodiments, the bitter oligopeptide is conjugated to any one or more of cellulose, fatty acids, polyethylene glycol (PEG) or combinations thereof.

Also provided herein are pharmaceutical compositions comprising one or more bitter oligopeptides and a pharmaceutically acceptable carrier. In some embodiments, the bitter oligopeptide stimulates release of glucagon-like peptide-1 (GLP-1), peptide tyrosine tyrosine (PYY) or a combination thereof. In some embodiments, the release of GLP-1, PYY or a combination thereof is mediated by G-protein coupled receptor (GPCR) signaling. In some embodiments, the GPCR comprises one or more of TAS2R38, TAS2R39, TAS2R46, TAS2R47, FFAR1, FFAR2, FFAR4 or FFAR4, SSTR2. In some embodiments, the bitter oligopeptides comprises one or more of YGLF (SEQ ID NO:1), YPFPG-PIPN (SEQ ID NO:2), IPAVF (SEQ ID NO: 3), LLF (SEQ ID NO:4), a combination thereof or an analog, pharmaceutical equivalent or a peptidomimetic thereof. In some embodiments, the bitter oligopeptide is conjugated to any one or more of cellulose, fatty acids, polyethylene glycol (PEG) or combinations thereof.

BRIEF DESCRIPTION OF THE FIGURES

Exemplary embodiments are illustrated in referenced figures. It is intended that the embodiments and figures disclosed herein are to be considered illustrative rather than restrictive.

FIG. 4A Synthesis of PTU-cellulose. FIG. 4B Average GLP-1 release in seven mice treated with PTU-Cellulose, PTU or Cellulose. The PTU-cellulose dose was 5 g/kg body weight; PTU was 200 mg/kg body weight; and cellulose was 5 g/kg body weight in Male C57Bl/6 mice. Blood was withdrawn at the times indicated and GLP-1 measured in serum from the blood using the EGLP-35K Glucagon Like Peptide-1 (Active) ELISA kit (Millipore, MA).

FIG. 9 depicts in accordance with various embodiments of the invention, stimulation of GLP-1 release by known bitter ligands, phytochemicals, and fatty acid ligands in cultured HuTu-80 cells.

FIG. 11 depicts in accordance with various embodiments of the invention, that increase in GLP-1 release with BPx1 is decreased when TAS2R expression in inhibited indicating that GLP-1 release is mediated by TAS2R38 activation by BPx1.

DETAILED DESCRIPTION OF THE INVENTION

Figure 1:
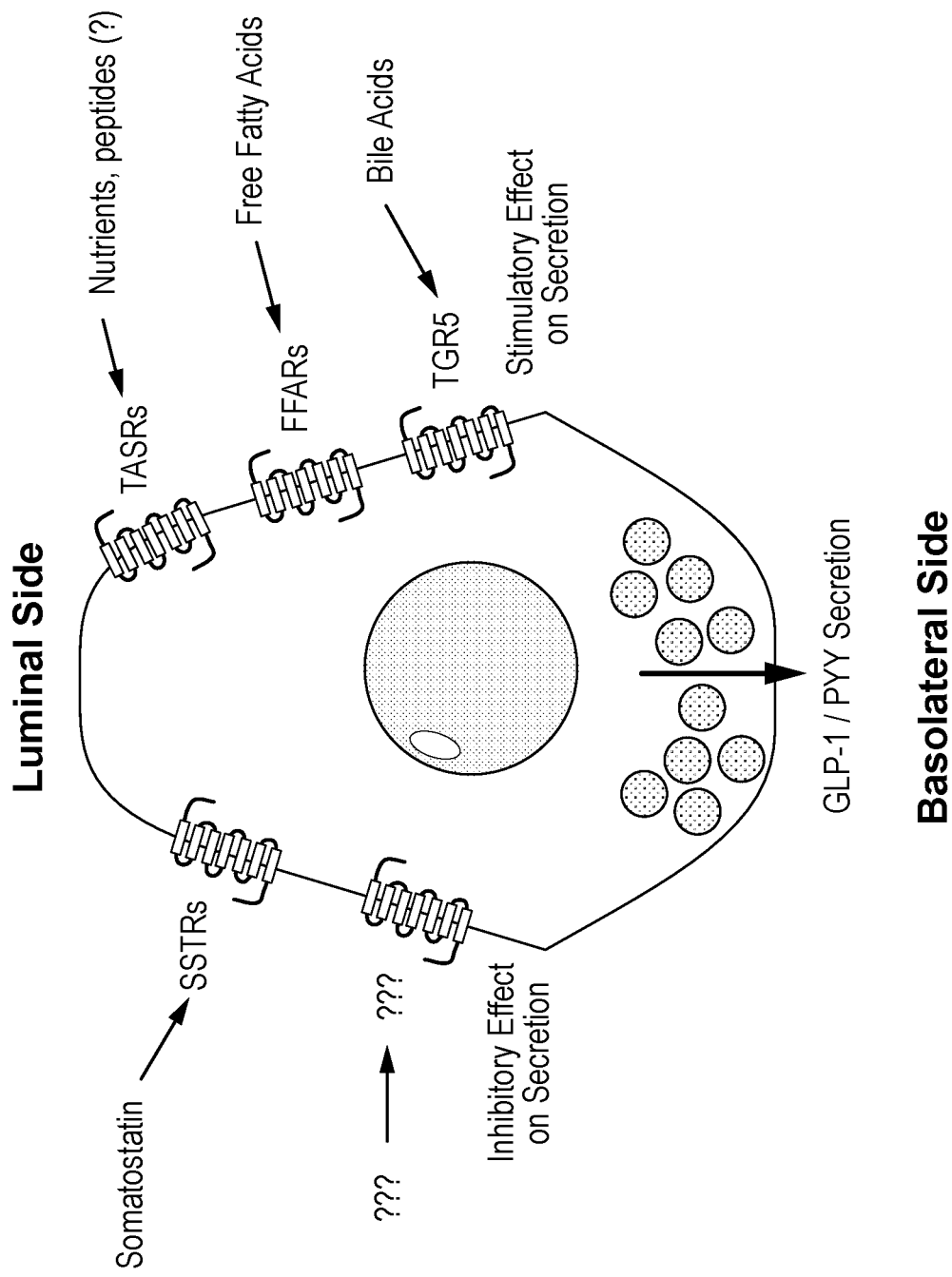
FIG. 1 depicts in accordance with various embodiments of the invention, summary of known receptors and their potential function in L-cells, including receptor mediated control of GLP-1 and PYY secretion from enteroendocrine cells. Question marks refer to yet unidentified receptors.

All references cited herein are incorporated by reference in their entirety as though fully set forth. Unless defined otherwise, technical and scientific terms used herein have the same meaning as commonly understood by one of ordinary skill in the art to which this invention belongs. Allen et al., Remington: The Science and Practice of Pharmacy 22nd ed., Pharmaceutical Press (Sep. 15, 2012); Hornyak et al., Introduction to Nanoscience and Nanotechnology, CRC Press (2008); Singleton and Sainsbury, Dictionary of Microbiology and Molecular Biology 3rd ed., revised ed., J. Wiley & Sons (New York, NY 2006); Smith, March's Advanced Organic Chemistry Reactions, Mechanisms and Structure 7th ed., J. Wiley & Sons (New York, NY 2013); Singleton, Dictionary of DNA and Genome Technology 3rd ed., Wiley-Blackwell (Nov. 28, 2012); and Green and Sambrook, Molecular Cloning: A Laboratory Manual 4th ed., Cold Spring Harbor Laboratory Press (Cold Spring Harbor, NY 2012), provide one skilled in the art with a general guide to many of the terms used in the present application. For references on how to prepare antibodies, see Greenfield, Antibodies A Laboratory Manual 2nd ed., Cold Spring Harbor Press (Cold Spring Harbor NY, 2013); Köhler and Milstein, Derivation of specific antibody-producing tissue culture and tumor lines by cell fusion, Eur. J. Immunol. 1976 July, 6(7):511-9; Queen and Selick, Humanized immunoglobulins, U.S. Pat. No. 5,585,089 (1996 December); and Riechmann et al., Reshaping human antibodies for therapy, Nature 1988 Mar. 24, 332(6162):323-7.

For references on pediatrics, see Schwartz et al., *The 5-Minute Pediatric Consult* 4th *ed.*, Lippincott Williams & Wilkins, (Jun. 16, 2005); Robertson et al., *The Harriet Lane Handbook: A Manual for Pediatric House Officers* 17th *ed.*, Mosby (Jun. 24, 2005); and Hay et al., *Current Diagnosis and Treatment in Pediatrics* (*Current Pediatrics Diagnosis & Treatment*) 18th *ed.*, McGraw-Hill Medical (Sep. 25, 2006).

One skilled in the art will recognize many methods and materials similar or equivalent to those described herein, which could be used in the practice of the present invention. Indeed, the present invention is in no way limited to the methods described herein. For purposes of the present invention, the following terms are defined below.

As used herein the term "comprising" or "comprises" is used in reference to compositions, methods, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

"Beneficial results" may include, but are in no way limited to, lessening or alleviating the severity of the disease condition, preventing the disease condition from worsening, preventing the disease condition from developing, lowering the chances of a patient developing the disease condition and prolonging a patient's life or life expectancy. Beneficial or desired clinical results include, but are not limited to, alleviation of one or more symptom(s), diminishment of extent of the deficit, stabilized (i.e., not worsening) state of diabetes progression, delay or slowing of diabetes, and amelioration or palliation of symptoms associated with the diabetes. Treatment also includes a decrease in mortality or an increase in the lifespan of a subject as compared to one not receiving the treatment.

"Administering" and/or "administer" as used herein refer to any route for delivering a pharmaceutical composition to a patient. In one embodiment, the compositions described herein are administered enterically to the small intestine. Routes of delivery may include non-invasive peroral (through the mouth), topical (skin), transmucosal (nasal, buccal/sublingual, vaginal, ocular and rectal) and inhalation routes, as well as parenteral routes, and other methods known in the art. Parenteral refers to a route of delivery that is generally associated with injection, including intraorbital, infusion, intraarterial, intracarotid, intracapsular, intracardiac, intradermal, intramuscular, intraperitoneal, intrapulmonary, intraspinal, intrasternal, intrathecal, intrauterine, intravenous, subarachnoid, subcapsular, subcutaneous, transmucosal, or transtracheal. Via the parenteral route, the compositions may be in the form of solutions or suspensions for infusion or for injection, or as lyophilized powders.

The term "effective amount" as used herein refers to the amount of a pharmaceutical composition comprising one or more peptides as disclosed herein or a mutant, variant, analog or derivative thereof, to decrease at least one or more symptom of the disease or disorder, and relates to a sufficient amount of pharmacological composition to provide the desired effect. The phrase "therapeutically effective amount" as used herein means a sufficient amount of the composition to treat a disorder, at a reasonable benefit/risk ratio applicable to any medical treatment.

A therapeutically or prophylactically significant reduction in a symptom is, e.g. at least about 10%, at least about 20%, at least about 30%, at least about 40%, at least about 50%, at least about 60%, at least about 70%, at least about 80%, at least about 90%, at least about 100%, at least about 125%, at least about 150% or more in a measured parameter as compared to a control or non-treated subject or the state of the subject prior to administering the oligopeptides described herein. Measured or measurable parameters include clinically detectable markers of disease, for example, elevated or depressed levels of a biological marker, as well as parameters related to a clinically accepted scale of symptoms or markers for diabetes. It will be understood, however, that the total daily usage of the compositions and formulations as disclosed herein will be decided by the attending physician within the scope of sound medical judgment. The exact amount required will vary depending on factors such as the type of disease being treated, gender, age, and weight of the subject.

As used herein, a "subject" means a human or animal. Usually the animal is a vertebrate such as a primate, rodent, domestic animal or game animal. Primates include chimpanzees, cynomologus monkeys, spider monkeys, and macaques, e.g., Rhesus. Rodents include mice, rats, woodchucks, ferrets, rabbits and hamsters. Domestic and game animals include cows, horses, pigs, deer, bison, buffalo, feline species, e.g., domestic cat, and canine species, e.g., dog, fox, wolf. The terms, "patient", "individual" and "subject" are used interchangeably herein. In an embodiment, the subject is mammal. The mammal can be a human, non-human primate, mouse, rat, dog, cat, horse, or cow, but are not limited to these examples. In addition, the methods described herein can be used to treat domesticated animals and/or pets. The term does not denote a particular age or sex. Thus, adult and newborn subjects, as well as fetuses, whether male or female, are intended to be included within the scope of this term.

As used herein, the terms "treat," "treatment," "treating," or "amelioration" refer to therapeutic treatments, wherein the object is to reverse, alleviate, ameliorate, inhibit, slow down or stop the progression or severity of a condition associated with, a disease or disorder. The term "treating" includes reducing or alleviating at least one adverse effect or symptom of a condition, disease or disorder, such as diabetes (such as type 2 diabetes). Treatment is generally "effective" if one or more symptoms or clinical markers are reduced. Alternatively, treatment is "effective" if the progression of a disease is reduced or halted. That is, "treatment" includes not just the improvement of symptoms or markers, but also a cessation of at least slowing of progress or worsening of symptoms that would be expected in absence of treatment. Beneficial or desired clinical results include, but are not limited to, alleviation of one or more symptom(s), diminishment of extent of disease, stabilized (i.e., not worsening) state of disease, delay or slowing of disease progression, amelioration or palliation of the disease state, and remission (whether partial or total), whether detectable or undetectable. The term "treatment" of a disease also includes providing relief from the symptoms or side-effects of the disease (including palliative treatment).

"Modulation" or "modulates" or "modulating" as used herein refers to upregulation (i.e., activation or stimulation), down regulation (i.e., inhibition or suppression) of a response or the two in combination or apart.

"Pharmaceutically acceptable carriers" as used herein refer to conventional pharmaceutically acceptable carriers useful in this invention.

"Promote" and/or "promoting" as used herein refer to an augmentation in a particular behavior of a cell or organism.

"Therapeutic agents" as used herein refers to agents that are used to, for example, treat, inhibit, prevent, mitigate the effects of, reduce the severity of, reduce the likelihood of developing, slow the progression of and/or cure, a disease. Diseases targeted by the therapeutic agents include but are not limited to diabetes, such as type 2 diabetes.

"Peptidomimetic" as used herein is a small protein-like chain designed to mimic a protein function. They may be modifications of an existing peptide or newly designed to mimic known peptides. They may be, for example peptoids and/or β-peptides and/or D-peptides.

"Recombinant virus" refers to a virus that has been genetically altered (e.g., by the addition or insertion of a heterologous nucleic acid construct into the particle).

A "gene" or "coding sequence" or a sequence which "encodes" a particular protein or peptide is a nucleic acid molecule that is transcribed (in the case of DNA) and translated (in the case of mRNA) into a polypeptide in vitro or in vivo when placed under the control of appropriate regulatory sequences. The boundaries of the gene are determined by a start codon at the 5' (i.e., amino) terminus and a translation stop codon at the 3' (i.e., carboxy) terminus. A gene can include, but is not limited to, cDNA from prokaryotic or eukaryotic mRNA, genomic DNA sequences from prokaryotic or eukaryotic DNA, and even synthetic DNA sequences. A transcription termination sequence will usually be located 3' to the gene sequence.

The term "control elements" refers collectively to promoter regions, polyadenylation signals, transcription termination sequences, upstream regulatory domains, origins of replication, internal ribosome entry sites ("IRES"), enhancers, and the like, which collectively provide for the replication, transcription and translation of a coding sequence in a recipient cell. Not all of these control elements need always be present, so long as the selected coding sequence is capable of being replicated, transcribed and translated in an appropriate host cell.

The term "promoter region" is used herein in its ordinary sense to refer to a nucleotide region including a DNA regulatory sequence, wherein the regulatory sequence is derived from a gene which is capable of binding RNA polymerase and initiating transcription of a downstream (3'-direction) coding sequence.

"Operably linked" refers to an arrangement of elements wherein the components so described are configured so as to perform their usual function. Thus, control elements operably linked to a coding sequence are capable of effecting the expression of the coding sequence. The control elements need not be contiguous with the coding sequence, so long as they function to direct the expression thereof. Thus, for example, intervening untranslated yet transcribed sequences can be present between a promoter sequence and the coding sequence and the promoter sequence can still be considered "operably linked" to the coding sequence.

"Gene transfer" or "gene delivery" refers to methods or systems for reliably inserting foreign DNA into host cells. Such methods can result in transient expression of non-integrated transferred DNA, extrachromosomal replication and expression of transferred replicons (e.g., episomes), or integration of transferred genetic material into the genomic DNA of host cells. Gene transfer provides a unique approach for the treatment of acquired and inherited diseases. A number of systems have been developed for gene transfer into mammalian cells. See, e.g., U.S. Pat. No. 5,399,346. Examples of well-known vehicles for gene transfer include adenovirus and recombinant adenovirus (RAd), adeno-associated virus (AAV), herpes simplex virus type 1 (HSV-1), and lentivirus (LV).

"Genetically modified cells", "genetically engineered cells", or "modified cells" as used herein refer to cells that express the polynucleotide having the sequence of any one or more of BPx1, BPx2, BPx3, BPx4 or a combination thereof, or a variant, derivative, pharmaceutical equivalent, peptidomimetic or an analog thereof. BPx1 consists of the sequence YGLF (SEQ ID NO: 1). BPx2 consists of the sequence YPFPGPIPN (SEQ ID NO: 2). BPx3 consists of the amino acid sequence IPAVF (SEQ ID NO: 3). BPx4 consists of the sequence LLF (SEQ ID NO: 4). In some embodiments, BPx1, BPx2, BPx3, BPx4 or a variant, derivative, pharmaceutical equivalent, peptidomimetic or an analog thereof, is conjugated with agents that increase intestinal retention, such as cellulose, fatty acids, polyethylene glycol (PEG) or combinations thereof.

"Naked DNA" as used herein refers to DNA encoding a polypeptide having the sequence of any one or more of BPx1, BPx2, BPx3, BPx4 or a combination thereof, or a variant, derivative, pharmaceutical equivalent, peptidomimetic or an analog thereof, cloned in a suitable expression vector in proper orientation for expression. Viral vectors which may be used include but are not limited SIN lentiviral vectors, retroviral vectors, foamy virus vectors, adeno-associated virus (AAV) vectors, hybrid vectors and/or plasmid transposons (for example sleeping beauty transposon system) or integrase based vector systems. Other vectors that may be used in connection with alternate embodiments of the invention will be apparent to those of skill in the art.

"Polynucleotide" as used herein includes but is not limited to DNA, RNA, cDNA (complementary DNA), mRNA (messenger RNA), rRNA (ribosomal RNA), shRNA (small hairpin RNA), snRNA (small nuclear RNA), snoRNA (short nucleolar RNA), miRNA (microRNA), genomic DNA, synthetic DNA, synthetic RNA, and/or tRNA.

The term "transfection" is used herein to refer to the uptake of foreign DNA by a cell. A cell has been "transfected" when exogenous DNA has been introduced inside the cell membrane. A number of transfection techniques are generally known in the art. See, e.g., Graham et al. Virology, 52:456 (1973); Sambrook et al. Molecular Cloning, a laboratory manual, Cold Spring Harbor Laboratories, New York (1989); Davis et al., Basic Methods in Molecular Biology, Elsevier (1986), and Chu et al. Gene 13:197 (1981). Such techniques can be used to introduce one or more exogenous DNA moieties, such as a plasmid vector and other nucleic acid molecules, into suitable host cells. The term refers to both stable and transient uptake of the genetic material.

"Vector", "cloning vector" and "expression vector" as used herein refer to the vehicle by which a polynucleotide sequence (e.g. a foreign gene) can be introduced into a host cell, so as to transform the host and promote expression (e.g. transcription and translation) of the introduced sequence. Vectors include plasmids, phages, viruses, etc.

"Gut" as used herein refers to the intestinal tract. The L cells that contain GLP-1 and PYY are primarily located in the distal small intestine (ileum) and colon.

"Bitter peptides" as used herein refers to peptide molecules that are bitter in taste. BP refers to bitter peptides.

As described, elevated postprandial glucagon-like peptide-1 (GLP-1) levels have been observed after bariatric surgery. Because the increase in GLP-1 has a significant gluco-regulatory role, the potential molecular mechanisms underlying the effect of the surgery on GLP-1 secretion may play a significant role in the diabetes resolution. Bariatric surgery (especially ones that directly route ingested nutrients to the mid small intestine) alters food digestion so that digestion and absorption of nutrients which is usually complete in the upper small intestine moves to the lower parts of the small intestine where the enteroendocrine L-cells responsible for GLP-1 release are located. Thus, the lumen contents in the distal small intestine will have partially digested components of the meal after the surgery, and that molecular constituents of undigested food might activate receptors on these cells to trigger GLP-1 release. A few nutrient receptors like the taste receptors and fatty acid receptors or their effectors have been shown to be present in these L-cells in human and animal tissues. We have identified several food-based bitter oligopeptides derived from hydrosylates of milk whey proteins (with origin from β-lactoglobulin, α-lactalbumin, albumin, and β-casein) that can individually cause GLP-1 release in in vitro models of the L-cells. These peptides can be enterically delivered to the small intestine where the target receptors are located. The interaction of the oligopeptides will cause GLP-1 release into the blood resulting in diabetes resolution. The treatment holds great promise in resolving type 2 diabetes by mimicking the potential mechanisms behind diabetes resolution after bariatric surgeries.

Bariatric surgery has provided an extremely favorable outcome in type 2 diabetes mellitus (T2DM) resolution in addition to the weight loss in obese surgery subjects. The diabetes resolution usually precedes substantial weight loss and occurs within a few days or weeks of the surgery. This suggests a fundamental shift in metabolic events in response to food ingestion after these surgeries. The effectiveness of these surgeries for weight loss and long term prognosis for diabetes prevention has led to several longitudinal studies tracking metabolic markers that have followed surgery patients and control patients for as little as a few weeks and as long as 10 years. Several studies have shown that β-cell glucose sensitivity increases independently of weight loss. The interplay of glucose sensitivity and GLP-1 response is complex. Studies have suggested that exaggerated GLP-1 response leads to an improved β-cell function, and hence plays a critical role in glucose tolerance improvement within first days after surgery. After this period, the improved hepatic insulin sensitivity is thought to play a role in glucose tolerance. One study showed the specific role of GLP-1 in normalizing glucose levels by using Exendin 9-39, a GLP-1 receptor antagonist in post-bariatric surgery patients. This study found that antagonizing the GLP-1R resulted in β-cell glucose sensitivity reverting to pre-surgery levels.

Because bariatric surgery (especially bypassing the proximal intestine with the Roux-en-Y gastric bypass (RYGB)) places the digestion of meal macronutrients into the mid small intestine there is a greater concentration of intermediate digestion products including oligopeptides that reach the ileum and colon, and which are usually completely digested and absorbed in the proximal small intestine. A digestion product profile of the luminal content is extremely challenging due to the impractical and risky nature of sampling luminal contents during a meal. The inventors reasoned that oligopeptides presented to the luminal surface could be responsible at least in part for the exaggerated GLP-1 responses to a test meal post bypass surgery. The inventors also found that bitter taste receptors especially TAS2R38 are present on the L cell in the small intestine so they reasoned that bitter tasting oligopeptides could interact with TAS2R38 and possibly other bitter receptors on the L cell to cause release of GLP-1.

Pepsin/trypsin/chymotrypsin digests of milk proteins, such as β-lactoglobulin, α-lactalbumin, albumin, and β-casein yield oligopeptide products that are bitter in taste (Liu et al. J. Agric. Food Chem. 2014, 62, 5719-5725). The inventors synthesized four of these oligopeptides and found that they enhance the release of GLP-1 with high potency. The Inventors' data suggest that low concentrations of food-derived bitter peptides, delivered to the ileum or colon, can cause metabolic responses beneficial to diabetes control through the release of GLP-1 (and peptide tyrosine tyrosine (PYY)) from L cells. The inventors hypothesize that T2DM resolution after bariatric surgery, especially RYGB, can be mimicked by delivering such oligopeptides to the distal intestine and postulate that oligopeptides agonize the GPCRs on the L-cells leading to enhanced GLP-1 responses and consequent T2DM resolution.

The bitter taste receptor TAS2R38 is a G protein coupled receptor (GPCR) that has been found in many extra-oral locations like the gastrointestinal (GI) system, respiratory system, and brain, though its function at these locations is only beginning to be understood. To probe the receptor's potential metabolic role, immunohistochemistry of human ileum tissues was performed, which showed that the receptor was co-localized with glucagon-like peptide 1 (GLP-1) in L-cells.

The invention described herein addresses the treatment of diabetes. Because the mechanisms addressed by this invention involve receptors facing the lumen of the GI tract, it is suggested that these oligopeptide molecules (for example, BPx1, BPx2, BPx3, BPx4 or combinations thereof) will be efficacious if they are formulated for enteric delivery. There are treatments with use of GLP-1 analogues and methods to prolong the life of secreted GLP-1 by inhibiting its breakdown. However, there are no solutions such as the one described herein. As the invention uses body's own endocrine system to treat diabetes, this is an advantage as current therapies have adverse effects of agents that are used. Examples are GLP-1 mimetic type agents that have been associated with significant adverse effects such as pancreatitis and pancreatic cancer.

Provided herein are pharmaceutical compositions comprising, consisting of or consisting essentially of agents that increase release of gut hormones (such as GLP-1, PYY or combinations thereof) and an acceptable carrier/excipient. In some embodiments, the agents are oligopeptides that are bitter indicating that they interact with bitter sensors on the tongue that are also represented in the ileum and colon of the gastrointestinal tract. In some embodiments, the bitter oligopeptides are any one or more of BPx1, BPx2, BPx3, BPx4 or combinations thereof or analogs, pharmaceutical equivalents and/or peptidomimetics thereof, as described herein. In certain aspects of all the embodiments of the invention, the oligopeptides further comprises a fusion protein. Specifically the fusion protein comprises the oligopeptides described herein fused to any one or more of an epitope tag, a half-life extender or a combination thereof. In certain embodiments, the one or more oligopeptide causes a 10%, 20%, 30%, 40%, 50%, 60%, 70%, 80%, 90% 95% Or 100% increase in release of gut hormones (such as GLP-1, PYY or combinations thereof). When administered therapeutically, the oligopeptide composition typically further comprises a pharmaceutically acceptable solution or carrier. In some aspects, the polypeptide or protein (for example, BPx1, BPx2, BPx3, BPx4 or combinations thereof) is a "modified polypeptide" comprising non-naturally occurring amino acids. In some aspects, the polypeptides comprise a combination of naturally occurring and non-naturally occurring amino acids, and in some embodiments, the peptides comprise only non-naturally occurring amino acids.

In one embodiment, the agent that results in increase of gut hormones (such as GLP-1, PYY or combinations thereof) comprises, consists of or consists essentially of the amino acid sequence YGLF (BPx1; SEQ ID NO: 1), or an analog, pharmaceutical equivalent or a peptidomimetic thereof. In some embodiments, BPx1 or a variant, derivative, pharmaceutical equivalent, peptidomimetic or an analog thereof, is conjugated with agents that increase intestinal retention. Examples of agents that increase intestinal retention include but are not limited to cellulose, fatty acids, polyethylene glycol (PEG) or combinations thereof.

In another embodiment, the agent that results in increase of gut hormones (such as GLP-1, PYY or combinations thereof) comprises, consists of or consists essentially of the amino acid sequence YPFPGPIPN (BPx2; SEQ ID NO: 2), or an analog, pharmaceutical equivalent or a peptidomimetic thereof. In some embodiments, BPx2 or a variant, derivative, pharmaceutical equivalent, peptidomimetic or an analog thereof, is conjugated with agents that increase intestinal retention. Examples of agents that increase intestinal retention include but are not limited to cellulose, fatty acids, polyethylene glycol (PEG) or combinations thereof.

In a further embodiment, the agent that results in increase of gut hormones (such as GLP-1, PYY or combinations thereof) comprises, consists of or consists essentially of the amino acid sequence IPAVF (BPx3; SEQ ID NO: 3), or an analog, pharmaceutical equivalent or a peptidomimetic thereof. In some embodiments, BPx3 or a variant, derivative, pharmaceutical equivalent, peptidomimetic or an analog thereof, is conjugated with agents that increase intestinal retention. Examples of agents that increase intestinal retention include but are not limited to cellulose, fatty acids, polyethylene glycol (PEG) or combinations thereof.

In an additional embodiment, the agent that results in increase of gut hormones (such as GLP-1, PYY or combinations thereof) comprises, consists of or consists essentially of the amino acid sequence LLF (SEQ ID NO:4) (BPx4), or an analog, pharmaceutical equivalent or a peptidomimetic thereof. In some embodiments, BPx4 or a variant, derivative, pharmaceutical equivalent, peptidomimetic or an analog thereof, is conjugated with agents that increase intestinal retention. Examples of agents that increase intestinal retention include but are not limited to cellulose, fatty acids, polyethylene glycol (PEG) or combinations thereof.

In some embodiments, the BPx1, BPx2, BPx3, BPx4 peptides or combinations thereof, or analogs, pharmaceutical equivalents and/or peptidomimetics thereof are modified peptides. "Modified peptide" may include the incorporation of lactam-bridge, head-to-tail cyclization, non-natural amino acids into the peptides of the invention, including synthetic non-native amino acids, substituted amino acids, or one or more D-amino acids into the peptides (or other components of the composition, with exception for protease recognition sequences) is desirable in certain situations. D-amino acid-containing peptides exhibit increased stability in vitro or in vivo compared to L-amino acid-containing forms. Thus, the construction of peptides incorporating D-amino acids can be particularly useful when greater in vivo or intracellular stability is desired or required. More specifically, D-peptides are resistant to endogenous peptidases and proteases, thereby providing better oral trans-epithelial and transdermal delivery of linked drugs and conjugates, improved bioavailability of membrane-permanent complexes (see below for further discussion), and prolonged intravascular and interstitial lifetimes when such properties are desirable. The use of D-isomer peptides can also enhance transdermal and oral trans-epithelial delivery of linked drugs and other cargo molecules. Additionally, D-peptides cannot be processed efficiently for major histocompatibility complex class II-restricted presentation to T helper cells, and are therefore less likely to induce humoral immune responses in the whole organism. Peptide conjugates can therefore be constructed using, for example, D-isomer forms of cell penetrating peptide sequences, L-isomer forms of cleavage sites, and D-isomer forms of therapeutic peptides. Therefore, in some embodiments the peptides as disclosed comprise L and D amino acids, wherein no more than 1, 2, 3, 4, 5, 6, 7, 8, 9, or 10 D-amino acids are included. In certain aspects, the peptides comprise more than 10 D-amino acids, and in certain aspects all the amino acids of the peptides are D-amino acids.

In some embodiments, the agents that result in increase in release of gut hormones (such as GLP-1, PYY or combinations thereof) are retro-inverso peptides of BPx1 peptide, BPx2 peptide, BPx3 peptide, BPx4 peptide or combinations thereof, or analogs, pharmaceutical equivalents and/or peptidomimetics thereof. A "retro-inverso peptide" refers to a peptide with a reversal of the direction of the peptide bond on at least one position, i.e., a reversal of the amino- and carboxy-termini with respect to the side chain of the amino acid. Thus, a retro-inverso analogue has reversed termini and reversed direction of peptide bonds while approximately maintaining the topology of the side chains as in the native peptide sequence. The retro-inverso peptide can contain L-amino acids or D-amino acids, or a mixture of L-amino acids and D-amino acids, up to all of the amino acids being the D-isomer. Partial retro-inverso peptide analogues are polypeptides in which only part of the sequence is reversed and replaced with enantiomeric amino acid residues. Since the retro-inverted portion of such an analogue has reversed amino and carboxyl termini, the amino acid residues flanking the retro-inverted portion are replaced by side-chain-analogous α-substituted geminal-diaminomethanes and malonates, respectively. Retro-inverso forms of cell penetrating peptides have been found to work as efficiently in translocating across a membrane as the natural forms. Synthesis of retro-inverso peptide analogues are described in Bonelli, F. et al., Int J Pept Protein Res. 24(6):553-6 (1984); Verdini, A and Viscomi, G. C, J. Chem. Soc. Perkin Trans. 1:697-701 (1985); and U.S. Pat. No. 6,261,569, which are incorporated herein in their entirety by reference. Processes for the solid-phase synthesis of partial retro-inverso peptide analogues have been described (EP 97994-B) which is also incorporated herein in its entirety by reference.

Other variants of the peptides described herein (for example, BPx1, BPx2, BPx3 and BPx4) can comprise conservatively substituted sequences, meaning that one or more amino acid residues of an original peptide are replaced by different residues, and that the conservatively substituted peptide retains a desired biological activity, i.e., the ability to increase release of gut hormones (such as GLP-1, PYY or combinations thereof) that is essentially equivalent to that of the original peptide. Examples of conservative substitutions include substitution of amino acids that do not alter the secondary and/or tertiary structure of BPx1, BPx2, BPx3 and/or BPx4, substitutions that do not change the overall or local hydrophobic character, substitutions that do not change the overall or local charge, substitutions by residues of equivalent sidechain size, or substitutions by sidechains with similar reactive groups.

Other examples involve substitution of amino acids that have not been evolutionarily conserved in the parent sequence across species. Advantageously, in some embodiments, these conserved amino acids and structures are not altered when generating conservatively substituted sequences.

A given amino acid can be replaced by a residue having similar physiochemical characteristics, e.g., substituting one aliphatic residue for another (such as Ile, Val, Leu, or Ala for one another), or substitution of one polar residue for another (such as between Lys and Arg; Glu and Asp; or Gln and Asn). Other such conservative substitutions, e.g., substitutions of entire regions having similar hydrophobicity characteristics or substitutions of residues with similar sidechain volume are well known. Isolated peptides comprising conservative amino acid substitutions can be tested in any one of the assays described herein to confirm that a desired activity, e.g. increase in release of gut hormones (such as GLP-1, PYY or combination thereof) is retained, as determined by the assays described elsewhere herein.

Amino acids can be grouped according to similarities in the properties of their side chains (in A. L. Lehninger, in Biochemistry, second ed., pp. 73-75, Worth Publishers, New York (1975)): (1) non-polar: Ala (A), Val (V), Leu (L), Ile (I), Pro (P), Phe (F), Trp (W), Met (M); (2) uncharged polar: Gly (G), Ser (S), Thr (T), Cys (C), Tyr (Y), Asn (N), Gln (Q); (3) acidic: Asp (D), Glu (E); (4) basic: Lys (K), Arg (R), His (H). Alternatively, naturally occurring residues can be divided into groups based on common side-chain properties: (1) hydrophobic: Norleucine, Met, Ala, Val, Leu, Ile, Phe, Trp; (2) neutral hydrophilic: Cys, Ser, Thr, Asn, Gln, Ala, Tyr, His, Pro, Gly; (3) acidic: Asp, Glu; (4) basic: His, Lys, Arg; (5) residues that influence chain orientation: Gly, Pro; (6) aromatic: Trp, Tyr, Phe, Pro, His, or hydroxyproline. Non-conservative substitutions will entail exchanging a member of one of these classes for another class.

Particularly preferred conservative substitutions for use in the variants described herein are as follows: Ala into Gly or into Ser; Arg into Lys; Asn into Gln or into His; Asp into Glu or into Asn; Cys into Ser; Gln into Asn; Glu into Asp; Gly into Ala or into Pro; His into Asn or into Gln; Ile into Leu or into Val; Leu into Ile or into Val; Lys into Arg, into Gln or into Glu; Met into Leu, into Tyr or into Ile; Phe into Met, into Leu or into Tyr; Ser into Thr; Thr into Ser; Trp into Tyr or into Phe; Tyr into Phe or into Trp; and/or Phe into Val, into Tyr, into Ile or into Leu. In general, conservative substitutions encompass residue exchanges with those of similar physicochemical properties (i.e. substitution of a hydrophobic residue for another hydrophobic amino acid).

Any cysteine residue not involved in maintaining the proper conformation of the isolated peptide as described herein can also be substituted, generally with serine, to improve the oxidative stability of the molecule and prevent aberrant crosslinking. Conversely, cysteine bond(s) can be added to the isolated peptide as described herein to improve its stability or facilitate multimerization.

As used herein, a "functional fragment" is a fragment or segment of a peptide comprising at least 3, at least 4 or at least 5 amino acids and which can increase release of gut hormones (such as GLP-1, PYY or combination thereof) according to the assays described herein. A functional fragment can comprise conservative substitutions of the sequences disclosed herein so long as they preserve the function of increasing release of gut hormones (such as GLP-1, PYY or combination thereof). This can be tested by detecting an increase in release of at least 30%, at least 40% or at least 50% of that of the parent (e.g. original) version of the peptide.

To enhance stability, bioavailability, and/or delivery of the peptides into the cells, the peptides can be modified. For example, in some embodiments, an isolated peptide as described herein can comprise at least one peptide bond replacement. A single peptide bond or multiple peptide bonds, e.g. 2 bonds, 3 bonds, 4 bonds, 5 bonds, or 6 or more bonds, or all the peptide bonds can be replaced. An isolated peptide as described herein can comprise one type of peptide bond replacement or multiple types of peptide bond replacements, e.g. 2 types, 3 types, 4 types, 5 types, or more types of peptide bond replacements. Non-limiting examples of peptide bond replacements include urea, thiourea, carbamate, sulfonyl urea, trifluoroethylamine, ortho-(aminoalkyl)-phenylacetic acid, para-(aminoalkyl)-phenylacetic acid, meta-(aminoalkyl)-phenylacetic acid, thioamide, tetrazole, boronic ester, olefinic group, and derivatives thereof. In some embodiments, BPx1, BPx2, BPx3, BPx4 or a variants, derivatives, pharmaceutical equivalents, peptidomimetics or analogs thereof, are conjugated with agents that increase intestinal retention. Examples of agents that increase intestinal retention include but are not limited to cellulose, fatty acids, polyethylene glycol (PEG) or combinations thereof.

In some embodiments, an isolated peptide as described herein can comprise naturally occurring amino acids commonly found in polypeptides and/or proteins produced by living organisms, e.g. Ala (A), Val (V), Leu (L), Ile (I), Pro (P), Phe (F), Trp (W), Met (M), Gly (G), Ser (S), Thr (T), Cys (C), Tyr (Y), Asn (N), Gln (Q), Asp (D), Glu (E), Lys (K), Arg (R), and His (H). In some embodiments, an isolated peptide as described herein can comprise alternative amino acids. Non-limiting examples of alternative amino acids include, D-amino acids; beta-amino acids; homocysteine, phosphoserine, phosphothreonine, phosphotyrosine, hydroxyproline, gamma-carboxyglutamate; hippuric acid, octahydroindole-2-carboxylic acid, statine, 1,2,3,4,-tetrahydroisoquinoline-3-carboxylic acid, penicillamine (3-mercapto-D-valine), ornithine, citruline, alpha-methyl-alanine, para-benzoylphenylalanine, para-amino phenylalanine, p-fluorophenylalanine, phenylglycine, propargylglycine, sarcosine, and tert-butylglycine), diaminobutyric acid, 7-hydroxy-tetrahydroisoquinoline carboxylic acid, naphthylalanine, biphenylalanine, cyclohexylalanine, amino-isobutyric acid, norvaline, norleucine, tert-leucine, tetrahydroisoquinoline carboxylic acid, pipecolic acid, phenylglycine, homophenylalanine, cyclohexylglycine, dehydroleucine, 2,2-diethylglycine, 1-amino-1-cyclopentanecarboxylic acid, 1-amino-1-cyclohexanecarboxylic acid, amino-benzoic acid, amino-naphthoic acid, gamma-aminobutyric acid, difluorophenylalanine, nipecotic acid, alpha-amino butyric acid, thienyl-alanine, t-butylglycine, trifluorovaline; hexafluoroleucine; fluorinated analogs; azide-modified amino acids; alkyne-modified amino acids; cyano-modified amino acids; and derivatives thereof.

In some embodiments, an isolated peptide can be modified, e.g. a moiety can be added to one or more of the amino acids comprising the peptide. In some embodiments, an isolated peptide as described herein can comprise one or more moiety molecules, e.g. 1 or more moiety molecules per peptide, 2 or more moiety molecules per peptide, 5 or more moiety molecules per peptide, 10 or more moiety molecules per peptide or more moiety molecules per peptide. In some embodiments, an isolated peptide as described herein can comprise one more types of modifications and/or moieties, e.g. 1 type of modification, 2 types of modifications, 3 types of modifications or more types of modifications. Non-limiting examples of modifications and/or moieties include PEGylation; glycosylation; HESylation; ELPylation; lipidation; acetylation; amidation; end-capping modifications; cyano groups; phosphorylation; and cyclization. In some embodiments, an end-capping modification can comprise acetylation at the N-terminus, N-terminal acylation, and N-terminal formylation. In some embodiments, an end-capping modification can comprise amidation at the C-terminus, introduction of C-terminal alcohol, aldehyde, ester, and thioester moieties.

An isolated peptide as described herein can be coupled and or connected to a second functional molecule, peptide and/or polypeptide. In some embodiments, an isolated peptide as described herein is coupled to a targeting molecule.

In some embodiments, an isolated peptide as described herein is coupled to a targeting molecule by expressing the peptide and the targeting molecule as a fusion peptide, optionally with a peptide linker sequence interposed between them. As used herein a "targeting molecule" can be any molecule, e.g. a peptide, antibody or fragment thereof, antigen, targeted liposome, or a small molecule that can bind to or be bound by a specific cell or tissue type. By way of non-limiting example, if it is desired to target an isolated peptide as described herein to the gut (e.g. to treat, inhibit, reduce the severity of and/or slow progression of diabetes, such as type 2 diabetes), an isolated peptide comprising the amino acid sequence of any of BPx1, BPx2, BPx3, BPx4 or a variant, derivative, pharmaceutical equivalent, peptidomimetic or an analog thereof could be coupled to an antibody or fragment thereof which is specific for the small intestine and colon, e.g. an antibody or antibody fragment as described in US Patent Publication 2005/0287066. By way of non-limiting example, if it is desired to target an isolated peptide as described herein to the gut to increase release of gut hormones such as GLP-1 and/or PYY so as to treat, inhibit, reduce the severity of and/or delay progression of diabetes (such as type 2 diabetes), an isolated peptide comprising the amino acid sequence of any of BPx1, BPx2, BPx3, BPx4 or a variant, derivative, pharmaceutical equivalent, peptidomimetic or an analog thereof could be coupled to an antibody or fragment thereof which is specific for the gut, e.g. IgA antibodies.

In some embodiments, an isolated peptide as described herein can be a fusion peptide or polypeptide. A fusion polypeptide can comprise a peptide linker domain interposed between the first domain of the peptide comprising an amino acid sequence LLF (SEQ ID NO:4) derivatives, variants, functional fragments, prodrug, or analog thereof or the peptides comprising the amino acid sequence SEQ ID NOs: 1-3 or derivatives, variants, functional fragments, prodrug, or analog thereof as described herein and at least a second domain of the fusion peptide. The first peptide domain can be the N-terminal domain or the C-terminal domain or an internal sequence in the case where the partner domain forms after fragment complementation of constituent parts. Methods of synthesizing or producing a fusion protein are well known to those of ordinary skill in the art. The term "fusion protein" as used herein refers to a recombinant protein of two or more proteins. Fusion proteins can be produced, for example, by a nucleic acid sequence encoding one protein is joined to the nucleic acid encoding another protein such that they constitute a single open-reading frame that can be translated in the cells into a single polypeptide harboring all the intended proteins. The order of arrangement of the proteins can vary. Fusion proteins can include an epitope tag or a half-life extender. Epitope tags include biotin, FLAG tag, c-myc, hemaglutinin, His6, digoxigenin, FITC, Cy3, Cy5, green fluorescent protein, V5 epitope tags, GST, B-galactosidase, AU1, AU5, and avidin. Half-life extenders include Fc domain and serum albumin.

In some embodiments, an isolated peptide as described herein can be a pharmaceutically acceptable prodrug. As used herein, a "prodrug" refers to compounds that can be converted via some chemical or physiological process (e.g., enzymatic processes and metabolic hydrolysis) to a therapeutic agent. Thus, the term "prodrug" also refers to a precursor of a biologically active compound that is pharmaceutically acceptable. A prodrug may be inactive when administered to a subject, i.e. an ester, but is converted in vivo to an active compound, for example, by hydrolysis to the free carboxylic acid or free hydroxyl. The prodrug compound often offers advantages of solubility, tissue compatibility or delayed release in an organism. The term "prodrug" is also meant to include any covalently bonded carriers, which release the active compound in vivo when such prodrug is administered to a subject. Prodrugs of an active compound may be prepared by modifying functional groups present in the active compound in such a way that the modifications are cleaved, either in routine manipulation or in vivo, to the parent active compound. Prodrugs include compounds wherein a hydroxy, amino or mercapto group is bonded to any group that, when the prodrug of the active compound is administered to a subject, cleaves to form a free hydroxy, free amino or free mercapto group, respectively. Examples of prodrugs include, but are not limited to, acetate, formate and benzoate derivatives of an alcohol or acetamide, formamide and benzamide derivatives of an amine functional group in the active compound and the like. See Harper, "Drug Latentiation" in Jucker, ed. *Progress in Drug Research* 4:221-294 (1962); Morozowich et al, "Application of Physical Organic Principles to Prodrug Design" in E. B. Roche ed. *Design of Biopharmaceutical Properties through Prodrugs and Analogs*, APHA Acad. Pharm. Sci. 40 (1977); *Bioreversible Carriers in Drug in Drug Design, Theory and Application*, E. B. Roche, ed., APHA Acad. Pharm. Sci. (1987); *Design of Prodrugs*, H. Bundgaard, Elsevier (1985); Wang et al. "Prodrug approaches to the improved delivery of peptide drug" in *Curr. Pharm. Design.* 5(4):265-287 (1999); Pauletti et al. (1997) Improvement in peptide bioavailability: Peptidomimetics and Prodrug Strategies, *Adv. Drug. Delivery Rev.* 27:235-256; Mizen et al. (1998) "The Use of Esters as Prodrugs for Oral Delivery of (3-Lactam antibiotics," *Pharm. Biotech.* 11:345-365; Gaignault et al. (1996) "Designing Prodrugs and Bioprecursors I. Carrier Prodrugs," *Pract. Med. Chem.* 671-696; Asgharnejad, "Improving Oral Drug Transport", in *Transport Processes in Pharmaceutical Systems*, G. L. Amidon, P. I. Lee and E. M. Topp, Eds., Marcell Dekker, p. 185-218 (2000); Balant et al., "Prodrugs for the improvement of drug absorption via different routes of administration", *Eur. J. Drug Metab. Pharmacokinet.*, 15(2): 143-53 (1990); Balimane and Sinko, "Involvement of multiple transporters in the oral absorption of nucleoside analogues", *Adv. Drug Delivery Rev.*, 39(1-3): 183-209 (1999); Browne, "Fosphenytoin (Cerebyx)", *Clin. Neuropharmacol.* 20(1): 1-12 (1997); Bundgaard, "Bioreversible derivatization of drugs—principle and applicability to improve the therapeutic effects of drugs", *Arch. Pharm. Chemi* 86(1): 1-39 (1979); Bundgaard H. "Improved drug delivery by the prodrug approach", *Controlled Drug Delivery* 17: 179-96 (1987); Bundgaard H. "Prodrugs as a means to improve the delivery of peptide drugs", Arfv. *Drug Delivery Rev.* 8(1): 1-38 (1992); Fleisher et al. "Improved oral drug delivery: solubility limitations overcome by the use of prodrugs", *Arfv. Drug Delivery Rev.* 19(2): 115-130 (1996); Fleisher et al. "Design of prodrugs for improved gastrointestinal absorption by intestinal enzyme targeting", *Methods Enzymol.* 112 (Drug Enzyme Targeting, Pt. A): 360-81, (1985); Farquhar D, et al., "Biologically Reversible Phosphate-Protective Groups", *Pharm. Sci.*, 72(3): 324-325 (1983); Freeman S, et al., "Bioreversible Protection for the Phospho Group: Chemical Stability and Bioactivation of Di(4-acetoxy-benzyl) Methylphosphonate with Carboxyesterase," *Chem. Soc., Chem. Commun.*, 875-877 (1991); Friis and Bundgaard, "Prodrugs of phosphates and phosphonates: Novel lipophilic alphaacyloxyalkyl ester derivatives of phosphate- or phosphonate containing drugs masking the negative charges of these groups", *Eur. J. Pharm. Sci.* 4:

49-59 (1996); Gangwar et al., "Pro-drug, molecular structure and percutaneous delivery", *Des. Biopharm. Prop. Prodrugs Analogs,* [*Symp.*] Meeting Date 1976, 409-21. (1977); Nathwani and Wood, "Penicillins: a current review of their clinical pharmacology and therapeutic use", *Drugs* 45(6): 866-94 (1993); Sinhababu and Thakker, "Prodrugs of anticancer agents", *Adv. Drug Delivery Rev.* 19(2): 241-273 (1996); Stella et al., "Prodrugs. Do they have advantages in clinical practice?", *Drugs* 29(5): 455-73 (1985); Tan et al. "Development and optimization of anti-HIV nucleoside analogs and prodrugs: A review of their cellular pharmacology, structure-activity relationships and pharmacokinetics", *Adv. Drug Delivery Rev.* 39(1-3): 117-151 (1999); Taylor, "Improved passive oral drug delivery via prodrugs", *Adv. Drug Delivery Rev.,* 19(2): 131-148 (1996); Valentino and Borchardt, "Prodrug strategies to enhance the intestinal absorption of peptides", *Drug Discovery Today* 2(4): 148-155 (1997); Wiebe and Knaus, "Concepts for the design of anti-HIV nucleoside prodrugs for treating cephalic HIV infection", *Adv. Drug Delivery Rev.:* 39(1-3):63-80 (1999); Waller et al., "Prodrugs", *Br. J. Clin. Pharmac.* 28: 497-507 (1989), which are incorporated by reference herein in their entireties.

In some embodiments, an isolated peptide as described herein can be a pharmaceutically acceptable solvate. The term "solvate" refers to an isolated peptide as described herein in the solid state, wherein molecules of a suitable solvent are incorporated in the crystal lattice. A suitable solvent for therapeutic administration is physiologically tolerable at the dosage administered. Examples of suitable solvents for therapeutic administration are ethanol and water. When water is the solvent, the solvate is referred to as a hydrate. In general, solvates are formed by dissolving the compound in the appropriate solvent and isolating the solvate by cooling or using an antisolvent. The solvate is typically dried or azeotroped under ambient conditions.

In some embodiments, an isolated peptide as described herein can be in a non-crystalline, i.e. amorphous solid form.

In one aspect, described herein is a vector comprising a nucleic acid encoding a peptide as described herein. The term "vector", as used herein, refers to a nucleic acid construct designed for delivery to a host cell or for transfer between different host cells. As used herein, a vector can be viral or non-viral. The term "vector" encompasses any genetic element that is capable of replication when associated with the proper control elements and that can transfer gene sequences to cells. A vector can include, but is not limited to, a cloning vector, an expression vector, a plasmid, phage, transposon, cosmid, chromosome, virus, virion, etc. Many vectors useful for transferring exogenous genes into target mammalian cells are available. The vectors can be episomal, e.g., plasmids, virus derived vectors such cytomegalovirus, adenovirus, etc., or can be integrated into the target cell genome, through homologous recombination or random integration, e.g., retrovirus derived vectors such MMLV, HIV-1, ALV, etc. Many viral vectors are known in the art and can be used as carriers of a nucleic acid modulatory compound into the cell. For example, constructs containing the nucleic acid encoding a polypeptide can be integrated and packaged into non-replicating, defective viral genomes like Adenovirus, Adeno-associated virus (AAV), or Herpes simplex virus (HSV) or others, including retroviral and lentiviral vectors, for infection or transduction into cells. Alternatively, the construct can be incorporated into vectors capable of episomal replication, e.g. EPV and EBV vectors. The nucleic acid incorporated into the vector can be operatively linked to an expression control sequence such that the expression control sequence controls and regulates the transcription and translation of that polynucleotide sequence.

As used herein, the term "expression vector" refers to a vector that directs expression of an RNA or polypeptide from sequences linked to transcriptional regulatory sequences on the vector. The sequences expressed will often, but not necessarily, be heterologous to the cell. An expression vector can comprise additional elements, for example, the expression vector can have two replication systems, thus allowing it to be maintained in two organisms, for example in human cells for expression and in a prokaryotic host for cloning and amplification.

The term "transfection" as used herein to methods, such as chemical methods, to introduce exogenous nucleic acids, such as the nucleic acid sequences encoding a peptide as described herein into a cell. As used herein, the term transfection does not encompass viral-based methods of introducing exogenous nucleic acids into a cell. Methods of transfection include physical treatments (electroporation, nanoparticles, magnetofection), and chemical-based transfection methods. Chemical-based transfection methods include, but are not limited to those that use cyclodextrin, polymers, liposomes, nanoparticles, cationic lipids or mixtures thereof (e.g., DOPA, Lipofectamine and UptiFectin), and cationic polymers, such as DEAE-dextran or polyethylenimine.

As used herein, the term "viral vector" refers to a nucleic acid vector construct that includes at least one element of viral origin and has the capacity to be packaged into a viral vector particle. The viral vector can contain the nucleic acid encoding a peptide as described herein in place of non-essential viral genes. The vector and/or particle can be utilized for the purpose of transferring any nucleic acids into cells either in vitro or in vivo. Numerous forms of viral vectors are known in the art. The term "replication incompetent" when used in reference to a viral vector means the viral vector cannot further replicate and package its genomes. For example, when the cells of a subject are infected with replication incompetent recombinant adeno-associated virus (rAAV) virions, the heterologous (also known as transgene) gene is expressed in the patient's cells, but, the rAAV is replication defective (e.g., lacks accessory genes that encode essential proteins for packaging the virus) and viral particles cannot be formed in the patient's cells. The term "transduction" as used herein refers to the use of viral particles or viruses to introduce exogenous nucleic acids into a cell.

Retroviruses, such as lentiviruses, provide a convenient platform for delivery of nucleic acid sequences encoding an agent of interest. A selected nucleic acid sequence can be inserted into a vector and packaged in retroviral particles using techniques known in the art. The recombinant virus can then be isolated and delivered to cells, e.g. in vitro or ex vivo. Retroviral systems are well known in the art and are described in, for example, U.S. Pat. No. 5,219,740; Kurth and Bannert (2010) "Retroviruses: Molecular Biology, Genomics and Pathogenesis" Calster Academic Press (ISBN:978-1-90455-55-4); and Hu and Pathak Pharmacological Reviews 2000 52:493-512; which are incorporated by reference herein in their entirety.

In some embodiments, a nucleotide sequence of interest is inserted into an adenovirus-based expression vector. Unlike retroviruses, which integrate into the host genome, adeno-viruses persist extrachromosomally thus minimizing the risks associated with insertional mutagenesis (Haj-Ahmad and Graham (1986) J. Virol. 57:267-74; Bett et al. (1993) J. Virol. 67:5911-21; Mittereder et al. (1994) Human Gene Therapy 5:717-29; Seth et al. (1994) J. Virol. 68:933-40; Barr et al. (1994) Gene Therapy 1:51-58; Berkner, K. L. (1988) BioTechniques 6:616-29; and Rich et al. (1993) Human Gene Therapy 4:461-76). Adenoviral vectors have several advantages in gene therapy. They infect a wide variety of cells, have a broad host-range, exhibit high efficiencies of infectivity, direct expression of heterologous sequences at high levels, and achieve long-term expression of those sequences in vivo. The virus is fully infective as a cell-free virion so injection of producer cell lines is not necessary. With regard to safety, adenovirus is not associated with severe human pathology, and the recombinant vectors derived from the virus can be rendered replication defective by deletions in the early-region 1 ("E1") of the viral genome. Adenovirus can also be produced in large quantities with relative ease. For all these reasons vectors derived from human adenoviruses, in which at least the E1 region has been deleted and replaced by a gene of interest, have been used extensively for gene therapy experiments in the pre-clinical and clinical phase. Adenoviral vectors for use with the compositions and methods described herein can be derived from any of the various adenoviral serotypes, including, without limitation, any of the over 40 serotype strains of adenovirus, such as serotypes 2, 5, 12, 40, and 41. The adenoviral vectors of used in the methods described herein are generally replication-deficient and contain the sequence of interest under the control of a suitable promoter. For example, U.S. Pat. No. 6,048,551, incorporated herein by reference in its entirety, describes replication-deficient adenoviral vectors that include a human gene under the control of the Rous Sarcoma Virus (RSV) promoter. Other recombinant adenoviruses of various serotypes, and comprising different promoter systems, can be created by those skilled in the art. See, e.g., U.S. Pat. No. 6,306,652, incorporated herein by reference in its entirety. Other useful adenovirus-based vectors for delivery of nucleic acid sequences include, but are not limited to: "minimal" adenovirus vectors as described in U.S. Pat. No. 6,306,652, which retain at least a portion of the viral genome required for encapsidation (the encapsidation signal), as well as at least one copy of at least a functional part or a derivative of the ITR; and the "gutless" (helper-dependent) adenovirus in which the vast majority of the viral genome has been removed and which produce essentially no viral proteins, such vectors can permit gene expression to persist for over a year after a single administration (Wu et al. (2001) Anesthes. 94:1119-32; Parks (2000) Clin. Genet. 58:1-11; Tsai et al. (2000) Curr. Opin. Mol. Ther. 2:515-23).

In some embodiments, a nucleotide sequence encoding a peptide as described herein is inserted into an adeno-associated virus-based expression vector. AAV is a parvovirus which belongs to the genus Dependovirus and has several features not found in other viruses. AAV can infect a wide range of host cells, including non-dividing cells. AAV can infect cells from different species. AAV has not been associated with any human or animal disease and does not appear to alter the biological properties of the host cell upon integration. Indeed, it is estimated that 80-85% of the human population has been exposed to the virus. Finally, AAV is stable at a wide range of physical and chemical conditions, facilitating production, storage and transportation. AAV is a helper-dependent virus; that is, it requires co-infection with a helper virus (e.g., adenovirus, herpesvirus or vaccinia) in order to form AAV virions in the wild. In the absence of co-infection with a helper virus, AAV establishes a latent state in which the viral genome inserts into a host cell chromosome, but infectious virions are not produced. Subsequent infection by a helper virus rescues the integrated genome, allowing it to replicate and package its genome into infectious AAV virions. While AAV can infect cells from different species, the helper virus must be of the same species as the host cell. Thus, for example, human AAV will replicate in canine cells co-infected with a canine adenovirus. Adeno-associated virus (AAV) has been used with success in gene therapy. AAV has been engineered to deliver genes of interest by deleting the internal nonrepeating portion of the AAV genome (i.e., the rep and cap genes) and inserting a heterologous sequence (in this case, the sequence encoding the agent) between the ITRs. The heterologous sequence is typically functionally linked to a heterologous promoter (constitutive, cell-specific, or inducible) capable of driving expression in the patient's target cells under appropriate conditions. Recombinant AAV virions comprising a nucleic acid sequence encoding an agent of interest can be produced using a variety of art-recognized techniques, as described in U.S. Pat. Nos. 5,139,941; 5,622,856; 5,139,941; 6,001,650; and 6,004,797, the contents of each of which are incorporated by reference herein in their entireties. Vectors and cell lines necessary for preparing helper virus-free rAAV stocks are commercially available as the AAV Helper-Free System (Catalog No. 240071) (Agilent Technologies, Santa Clara, Calif.).

Additional viral vectors useful for delivering nucleic acid molecules encoding a peptide as described herein include those derived from the pox family of viruses, including vaccinia virus and avian poxvirus. Alternatively, avipoxviruses, such as the fowlpox and canarypox viruses, can be used to deliver the genes. The use of avipox vectors in cells of human and other mammalian species is advantageous with regard to safety because members of the avipox genus can only productively replicate in susceptible avian species. Methods for producing recombinant avipoxviruses are known in the art and employ genetic recombination, see, e.g., WO 91/12882; WO 89/03429; and WO 92/03545.

Molecular conjugate vectors, such as the adenovirus chimeric vectors, can also be used for delivery of sequence encoding a peptide as described herein (Michael et al. (1993) J. Biol. Chem. 268:6866-69 and Wagner et al. (1992) Proc. Natl. Acad. Sci. USA 89:6099-6103). Members of the Alphavirus genus, for example the Sindbis and Semliki Forest viruses, can also be used as viral vectors for delivering a nucleic acid sequence (See, e.g., Dubensky et al. (1996) J. Virol. 70:508-19; WO 95/07995; WO 96/17072).

In some embodiments, the vector further comprises a signal peptide operably linked to the peptide. Signal peptides are terminally (usually N-terminally) located peptide sequences that provide for passage of the protein into or through a membrane. Different signal peptides can be of use in different applications. For example, as regards a cellular system for the production of isolated peptides as described herein, a secretory signal peptide can permit increased yields and ease of purification. As a further example, as regards cells which produce peptides as described herein and which are administered for therapeutic purposes to a subject, multiple signal peptides, e.g. a peptide signaling for secretion from the first cell, a peptide signaling for internalization by a second cell, and a final peptide signaling for nuclear localization can increase the amount of peptide reaching the target environment. As a further example, as regards, e.g. gene therapy applications, a peptide signaling for nuclear localization can increase the amount of peptide reaching the target environment. Signal peptides are known in the art. Non-limiting examples of nuclear localization signal (NLS) peptides for use in mammalian cells include; the SV40 large T-antigen NLS (PKKKRKV) (SEQ ID NO: 4); the nucleoplasmin NLS (KR[PAATKKAGQA]KKKK)(SEQ ID NO: 5); the K-K/R-X-K/R (SEQ ID NO: 6) consensus NLS (KKXR (SEQ ID NO: 7); KKXK (SEQ ID NO: 8); KRXK (SEQ ID NO: 9); KRXR (SEQ ID NO: 10); and PY-NLSs (see, e.g. Dingwall et al. J Cell Biol 188 107:841-9 and Makkerh et al. Curr Biol. 1996 6:1025-7; both of which are incorporated by reference herein in their entireties, for further discussion). Non-limiting examples of secretion signal peptides for use in mammalian cells include human albumin signal peptide (MKWVTFISLLFLFSSAYS) (SEQ ID NO: 11); human chymotrypsin signal peptide (MAFLWLLSCWALLGTTGF) (SEQ ID NO: 12); human interleukin-2 signal peptide (MQLLSCIALILALV) (SEQ ID NO: 13); human trypsinogen-2 signal peptide (MNLLLILTFVAAAVA) (SEQ ID NO: 14); and sequences which include a coding region for a signal for precursor cleavage by signal peptidase, furin or other prohormone convertases (e.g., PC3). For example, a signal (peptide) sequence which is cleaved by furin (also known as PACE, see U.S. Pat. No. 5,460,950), other subtilisins (including PC2, PC1/PC3, PACE4, PC4, PC5/PC6, LPC/PC7IPC8/SPC7 and SKI-I; Nakayama, Biochem. J., 327:625-635 (1997)); enterokinase (see U.S. Pat. No. 5,270,181) or chymotrypsin can be introduced into the signal (peptide) sequence as defined herein. Additional signal peptides are known in the art and the choice of signal peptide can be influenced by the cell type, growth conditions, and the desired destination of the peptide.

In one aspect, described herein is a cell expressing a vector comprising a nucleic acid econding a peptide as described herein. In some embodiments, the cell expressing a vector as described herein is a cell suitable for the production of polypeptides. A cell suitable for the production of polypeptides can be a prokaryotic or eukaryotic cell, e.g. bacteria, virus, yeast, fungi, mammalian cells, insect cells, plant cells, and the like. By way of non-limiting example, cells for the production of proteins are commercially available, e.g. bacterial cells (BL21 derived cells— Cat. No. 60401-1, Lucigen; Middleton, WI and mammalian cells (293 F cells—Cat. No. 11625-019, Invitrogen; Grand Island, NY).

Recombinant molecules, e.g. vectors as described herein, can be introduced into cells via transformation, particularly transduction, conjugation, lipofection, protoplast fusion, mobilization, particle bombardment, electroporation (Neumann et al., "Gene Transfer into Mouse Lyoma Cells by Electroporation in High Electric Fields," *EMBO J.* 1(7):841-845 (1982); Wong et al., "Electric Field Mediated Gene Transfer," *Biochem Biophys Res Commun* 107(2):584-587 (1982); Potter et al., "Enhancer-dependent Expression of Human Kappa Immunoglobulin Genes Introduced into Mouse pre-B Lymphocytes by Electroporation," *Proc. Natl. Acad. Sci. USA* 81(22):7161-7165 (1984), which are hereby incorporated by reference in their entirety), polyethylene glycol-mediated DNA uptake (Joseph Sambrook & David W. Russell, *Molecular Cloning: A Laboratory Manual* cp. 16 (2d ed. 1989), which is hereby incorporated by reference in its entirety), or fusion of protoplasts with other entities (e.g., minicells, cells, lysosomes, or other fusible lipid-surfaced bodies that contain the chimeric gene) (Fraley et al., "Liposome-mediated Delivery of Tobacco Mosaic Virus RNA into Tobacco Protoplasts: A Sensitive Assay for Monitoring Liposome-protoplast Interactions," *Proc. Natl. Acad. Sci. USA,* 79(6):1859-1863 (1982), which is hereby incorporated by reference in its entirety). The host cell is then cultured in a suitable medium, and under conditions suitable for expression of the protein or polypeptide of interest. After cultivation, the cell is disrupted by physical or chemical means, and the protein or polypeptide purified from the resultant crude extract. Alternatively, cultivation may include conditions in which the protein or polypeptide is secreted into the growth medium of the recombinant host cell, and the protein or polypeptide is isolated from the growth medium. Alternative methods may be used as suitable.

The peptides can also be attached to adjuvants. The term "adjuvant" refers to a compound or mixture that enhances the immune response and/or promotes the proper rate of absorption following inoculation, and, as used herein, encompasses any uptake-facilitating agent. Non-limiting examples of adjuvants include, chemokines (e.g., defensins, HCC-1, HCC4, MCP-1, MCP-3, MCP4, MIP-1α, MIP-1β, MIP-1δ, MIP-3α, MIP-2, RANTES); other ligands of chemokine receptors (e.g., CCR1, CCR-2, CCR-5, CCR6, CXCR-1); cytokines (e.g., IL-1β, IL-2, IL-4, IL-5, IL-6, IL-7, IL-8, IL-10, IL-12, IL-13, IL-15, IL-17 (A-F), IL-18; IFNα, IFN-γ; TNF-α; GM-CSF); TGF)-β; FLT-3 ligand; CD40 ligand; other ligands of receptors for those cytokines; Th1 cytokines including, without limitation, IFN-γ, IL-2, IL-12, IL-18, and TNF; Th2 cytokines including, without limitation, IL-4, IL-5, IL-10, and IL-13; and Th17 cytokines including, without limitation, IL-17 (A through F), IL-23, TGF-β and IL-6; immunostimulatory CpG motifs in bacterial DNA or oligonucleotides; derivatives of lipopolysaccharides such as monophosphoryl lipid A (MPL); muramyl dipeptide (MDP) and derivatives thereof (e.g., murabutide, threonyl-MDP, muramyl tripeptide, N-acetyl-muramyl-L-threonyl-D-isoglutamine (thr-MDP); N-acetyl-nor-muramyl-L-alanyl-D-isoglutamine (CGP 11637, referred to as nor-MDP); N-acetylmuramyl-L-alanyl-D-isoglutaminyl-L-alani-ne-2-(1'-2'-dipalmitoyl-sn-glycero-3hydroxyphosphoryloxy)-ethylamine (CGP 19835A, referred to as MTP-PE)); MF59 (see Int'l Publication No. WO 90/14837); poly[di (carboxylatophenoxy)phosphazene] (PCPP polymer; Virus Research Institute, USA); RIBI (GSK), which contains three components extracted from bacteria, monophosphoryl lipid A, trehalose dimycolate and cell wall skeleton (MPL+ TDM+CWS) in a 2% squalene/Tween 80 emulsion; OM-174 (a glucosamine disaccharide related to lipid A; OM Pharma SA, Meyrin, Switzerland); heat shock proteins and derivatives thereof; *Leishmania* homologs of elF4a and derivatives thereof; bacterial ADP-ribosylating exotoxins and derivatives thereof (e.g., genetic mutants, A and/or B subunit-containing fragments, chemically toxoided versions); chemical conjugates or genetic recombinants containing bacterial ADP-ribosylating exotoxins or derivatives thereof; C3d tandem array; lipid A and derivatives thereof (e.g., monophosphoryl or diphosphoryl lipid A, lipid A analogs, AGP, AS02, AS04, DC-Chol, Detox, OM-174); ISCOMS and saponins (e.g., Quil A, QS-21, Stimulon® (Cambridge Bioscience, Worcester, MA)); squalene; superantigens; or salts (e.g., aluminum hydroxide or phosphate, calcium phosphate). See also Nohria et al. *Biotherapy,* 7:261-269, 1994; Richards et al., in *Vaccine Design,* Eds. Powell et al., Plenum Press, 1995; and Pashine et al., *Nature Medicine,* 11:S63-S68, April 2005) for other useful adjuvants. Further examples of adjuvants can include the RIBI adjuvant system (Ribi Inc., Hamilton, MT.), alum, mineral gels such as aluminum hydroxide gel, oil-in-water emulsions, water-in-oil emulsions such as, e.g., Freund's complete and incomplete adjuvants, Block co-polymer (CytRx, Atlanta GA), QS-21 (Cambridge Biotech Inc., Cambridge MA), and SAF-M (Chiron, Emeryville CA), AMPHIGEN® adjuvant, saponin, Quil A or other saponin fraction, monophosphoryl lipid A, and Avridine lipid-amine adjuvant, and METASTIM®. Other suitable adjuvants can include, for example, surface active substances such as lysolecithin, pluronic polyols, polyanions, peptides, oil or hydrocarbon emulsions, keyhole limpet hemocyanins, dinitrophenol, and others.

In some embodiment, cell may be genetically engineered to express the peptides described herein and the genetically engineered cells may be used for cell therapy. Examples of cells that may be used include but are not limited to, dendritic cells, T-lymphocytes (T-cells), naïve T cells ($T_N$), memory T cells (for example, central memory T cells ($T_{CM}$), effector memory cells ($T_{EM}$)), natural killer cells, hematopoietic stem cells and/or pluripotent embryonic/induced stem cells capable of giving rise to therapeutically relevant progeny. In an embodiment, the genetically engineered cells are autologous cells. By way of example, individual T-cells of the invention may be CD4+/CD8−, CD4−/CD8+, CD4−/CD8− or CD4+/CD8+. The T-cells may be a mixed population of CD4+/CD8− and CD4−/CD8+ cells or a population of a single clone. CD4+ T-cells may produce IL-2, IFN☐, TNF☐ and other T-cell effector cytokines when co-cultured in vitro with cells expressing the peptides (for example CD20+ and/or CD19+ tumor cells). $CD8^+$ T-cells may lyse antigen-specific target cells when co-cultured in vitro with the target cells. In some embodiments, T cells may be any one or more of $CD45RA^+$ $CD62L^+$ naïve cells, $CD45RO^+$ $CD62L^+$ central memory cells, $CD62L^−$ effector memory cells or a combination thereof (Berger et al., Adoptive transfer of virus-specific and tumor-specific T cell immunity. *Curr Opin Immunol* 2009 21(2)224-232).

In some embodiments, tolerized antigen presenting cells may be used in cell therapy. Examples include B cells, dendritic cells, macrophages and the like. The cells may be of any origin, including from humans. The cells may be tolerized using the peptides described herein. In some embodiments, the cells are tolerized in the presence of cytokines.

In some embodiments, the cell producing the peptide as described herein can be administered to a subject, e.g. for treating, inhibiting, reducing the severity of and/or slow progression of diabetes (such as type 2 diabetes mellitus).

In some embodiments, nanoparticles containing the peptide as described herein can be administered to a subject. In some embodiments, the nanoparticles for use with the peptides described herein may be as described in Levine et al., Polymersomes: A new multi-functional tool for cancer diagnosis and therapy. Methods 2008 Vol 46 pg 25-32 or as described in S Jain, et al., Gold nanoparticles as novel agents for cancer therapy. Br J Radiol. 2012 February; 85(1010): 101-113.

In some embodiments, the cell expressing a vector encoding a peptide as described herein can be a cell of a subject, e.g. a subject administered gene therapy for the treatment, inhibition, reduction of severity and/or slow progression of diabetes (such as type 2 diabetes mellitus). Vectors for gene therapy can comprise viral or non-viral vectors as described elsewhere herein.

Methods of Use

Provided herein are methods for treating, inhibiting, reducing the severity of, slowing progression of and/or promoting prophylaxis of a disease-state in a subject in need thereof. The methods include providing a composition comprising an agent that increases release of gut hormones (such as GLP-1 and/or PYY) and administering an effective amount of the composition to the subject so as to treat, inhibit, reduce the severity of and/or promote prophylaxis of the disease state. In some embodiments, GLP-1 is any one or more of GLP-1-(7-37), GLP-1-(7-36)NH2 or a combination thereof. In various embodiments, the disease-state is diabetes. In one embodiment, diabetes is type 2 diabetes mellitus. In another embodiment, the disease-state is obesity. In some embodiments, the agent is an agonist of any one or more of SSTR2, TAS2R38, TAS2R39, TAS2R46, TAS2R47, FFAR1, FFAR2, FFAR4 or FFAR4 receptors. In another embodiment, the agent is an antagonist of somatostatin. In one embodiment, the agent comprises bitter oligopeptides. In some embodiments, the agent that increases release of gut hormones is any one or more of BPx1, BPx2, BPx3, BPx4 or a combination thereof, or analog, pharmaceutical equivalent or a peptidomimetic thereof. In some embodiments, the bitter oligopeptides are conjugated to agents that increase intestinal (for example, distal small intestine) retention. In exemplary embodiments, agents that increase intestinal retention include but are not limited to cellulose, fatty acids, polyethylene glycol (PEG) or combinations thereof. In some embodiments, treating, inhibiting, reducing the severity of and/or promoting prophylaxis of the disease state further comprises administering fatty acids and/or botanical molecules found in foods. In exemplary embodiments, fatty acids or botanical molecules found in foods include but are not limited to any one or more of urolithin A, ellagic acid, ursolic acid, oleanolic acid, 6-m-propyl-2-thiouracil, propionic acid, butyrate, palmitic acid or combinations thereof. In some embodiments, treating, inhibiting, reducing the severity of and/or promoting prophylaxis of the disease state further comprises administering PTU conjugated to cellulose (PTU-cellulose). In various embodiments, the agent that increases release of gut hormones in combination with fatty acids, botanical molecules found in food and/or PTU-cellulose are administered sequentially or simultaneously. In various embodiments, the agent that increases release of gut hormones in combination with fatty acids and/or PTU-cellulose are administered orally, enterically to the small intestine or to the colon by rectal suppository or enema. In one embodiment, the subject is human. In various embodiments, the compositions described herein are administrated to the subject before, during, or after the subject develops the disease-state. In some embodiments, the composition is administrated to the subject 1-3 times per day or 1-7 times per week. In some embodiments, the composition is administrated to the subject for 1-5 days, 1-5 weeks, 1-5 months, or 1-5 years.

Also provided herein are methods for treating, inhibiting, reducing the severity of, slowing progression of and/or promoting prophylaxis of diabetes in a subject in need thereof. The methods include providing a composition comprising an agent that increases release of gut hormones (such as GLP-1 and/or PYY) and administering an effective amount of the composition to the subject so as to treat, inhibit, reduce the severity of and/or promote prophylaxis of diabetes in the subject. In some embodiments, GLP-1 is any one or more of GLP-1-(7-37), GLP-1-(7-36)NH2 or a combination thereof. In one embodiment, diabetes is type 2 diabetes mellitus. In some embodiments, the agent is an agonist of any one or more of SSTR2, TAS2R38, TAS2R39, TAS2R46, TAS2R47, FFAR1, FFAR2, FFAR4 or FFAR4 receptors. In another embodiment, the agent is an antagonist of somatostatin. In one embodiment, the agent comprises bitter oligopeptides. In some embodiments, the agent that increases release of gut hormones is any one or more of BPx1, BPx2, BPx3, BPx4 or a combination thereof, or analog, pharmaceutical equivalent or a peptidomimetic thereof. In some embodiments, the bitter oligopeptides are conjugated to agents that increase intestinal (for example, distal small intestine) retention. In exemplary embodiments, agents that increase cellular retention include but are not limited to cellulose, fatty acids, polyethylene glycol (PEG) or combinations thereof. In some embodiments, treating, inhibiting, reducing the severity of and/or promoting prophylaxis of the diabetes further comprises administering fatty acids and/or botanical molecules found in foods that increase GLP-1 release. In exemplary embodiments, fatty acids or botanical molecules found in food include but are not limited to any one or more of urolithin A, ellagic acid, ursolic acid, oleanolic acid, 6-m-propyl-2-thiouracil, propionic acid, butyrate, palmitic acid or combinations thereof. In some embodiments, treating, inhibiting, reducing the severity of and/or promoting prophylaxis of the diabetes further comprises administering PTU conjugated to cellulose (PTU-cellulose). In various embodiments, the agent that increases release of gut hormones in combination with fatty acids and/or PTU-cellulose are administered sequentially or simultaneously. In various embodiments, the agent that increases release of gut hormones in combination with fatty acids and/or PTU-cellulose are administered orally, enterically to the small intestine or to the colon by rectal suppository or enema. In one embodiment, the subject is human. In various embodiments, the compositions described herein are administrated to the subject before, during, or after the subject develops the disease-state. In some embodiments, the composition is administrated to the subject 1-3 times per day or 1-7 times per week. In some embodiments, the composition is administrated to the subject for 1-5 days, 1-5 weeks, 1-5 months, or 1-5 years.

Further provided herein are methods for treating, inhibiting, reducing the severity of, slowing progression of and/or promoting prophylaxis of obesity in a subject in need thereof. The methods include providing a composition comprising an agent that increases release of gut hormones (such as GLP-1 and/or PYY) and administering an effective amount of the composition to the subject so as to treat, inhibit, reduce the severity of and/or promote prophylaxis of obesity in the subject. In some embodiments, GLP-1 is any one or more of GLP-1-(7-37), GLP-1-(7-36)NH2 or a combination thereof. In some embodiments, the agent is an agonist of any one or more of SSTR2, TAS2R38, TAS2R39, TAS2R46, TAS2R47, FFAR1, FFAR2, FFAR4 or FFAR4 receptors. In another embodiment, the agent is an antagonist of somatostatin. In one embodiment, the agent comprises bitter oligopeptides. In some embodiments, the agent that increases release of gut hormones is any one or more of BPx1, BPx2, BPx3, BPx4 or a combination thereof, or analog, pharmaceutical equivalent or a peptidomimetic thereof. In some embodiments, the bitter oligopeptides are conjugated to agents that increase intestinal (for example, distal small intestine) retention. In exemplary embodiments, agents that increase cellular retention include but are not limited to cellulose, fatty acids, polyethylene glycol (PEG) or combinations thereof. In some embodiments, treating, inhibiting, reducing the severity of and/or promoting prophylaxis of obesity further comprises administering fatty acids and/or botanical molecules found in foods that increase GLP-1 release. In exemplary embodiments, fatty acids or botanical molecules found in food include but are not limited to any one or more of urolithin A, ellagic acid, ursolic acid, oleanolic acid, 6-m-propyl-2-thiouracil, propionic acid, butyrate, palmitic acid or combinations thereof. In some embodiments, treating, inhibiting, reducing the severity of and/or promoting prophylaxis of obesity further comprises administering PTU conjugated to cellulose (PTU-cellulose). In various embodiments, the agent that increases release of gut hormones in combination with fatty acids and/or PTU-cellulose are administered sequentially or simultaneously. In various embodiments, the agent that increases release of gut hormones in combination with fatty acids and/or PTU-cellulose are administered orally, enterically to the small intestine or to the colon by rectal suppository or enema. In one embodiment, the subject is human. In various embodiments, the compositions described herein are administrated to the subject before, during, or after the subject develops the disease-state. In some embodiments, the composition is administrated to the subject 1-3 times per day or 1-7 times per week. In some embodiments, the composition is administrated to the subject for 1-5 days, 1-5 weeks, 1-5 months, or 1-5 years In some embodiments, BPx1, BPx2, BPx3, BPx4 and/or a combination thereof, or analog, pharmaceutical equivalent or a peptidomimetic thereof for treatment of diabetes as described herein may be co-administered with existing treatments for diabetes. The oligopeptides BPx1, BPx2, BPx3, BPx4 and/or a combination thereof, or analog, pharmaceutical equivalent or a peptidomimetic may be administered sequentially or simultaneously with the existing treatments for diabetes. In some embodiments, existing treatments that may be used with the methods described herein include but are not limited to SGLT2 inhibitors (such as Canagliflozin (Invokana), Dapagliflozin (Farxiga), Empagliflozin (Jardiance)), insulin, inhaled insulin, sulfonyl ureas, metformin, acarbose, thiazolidinediones or combinations thereof.

In various embodiments, the effective amount of the agent (for example, any one or more of BPx1, BPx2, BPx3, BPx4 and/or a combination thereof, or analog, pharmaceutical equivalent or a peptidomimetic thereof) that increases release of gut hormones such as GLP-1, PYY or a combination thereof is any one or more of about 0.01 to 0.05 µg/kg/day, 0.05-0.1 µg/kg/day, 0.1 to 0.5 µg/kg/day, 0.5 to 5 µg/kg/day, 5 to 10 µg/kg/day, 10 to 20 µg/kg/day, 20 to 50 µg/kg/day, 50 to 100 µg/kg/day, 100 to 150 µg/kg/day, 150 to 200 µg/kg/day, 200 to 250 µg/kg/day, 250 to 300 µg/kg/day, 300 to 350 µg/kg/day, 350 to 400 µg/kg/day, 400 to 500 µg/kg/day, 500 to 600 µg/kg/day, 600 to 700 µg/kg/day, 700 to 800 µg/kg/day, 800 to 900 µg/kg/day, 900 to 1000 µg/kg/day, 0.01 to 0.05 mg/kg/day, 0.05-0.1 mg/kg/day, 0.1 to 0.5 mg/kg/day, 0.5 to 1 mg/kg/day, 1 to 5 mg/kg/day, 5 to 10 mg/kg/day, 10 to 15 mg/kg/day, 15 to 20 mg/kg/day, 20 to 50 mg/kg/day, 50 to 100 mg/kg/day, 100 to 200 mg/kg/day, 200 to 300 mg/kg/day, 300 to 400 mg/kg/day, 400 to 500 mg/kg/day, 500 to 600 mg/kg/day, 600 to 700 mg/kg/day, 700 to 800 mg/kg/day, 800 to 900 mg/kg/day, 900 to 1000 mg/kg/day or a combination thereof. Typical dosages of the agent (for example, any one or more of BPx1, BPx2, BPx3, BPx4 and/or a combination thereof, or analog, pharmaceutical equivalent or a peptidomimetic thereof) that increases release of gut hormones such as GLP-1, PYY or a combination thereof can be in the ranges recommended by the manufacturer where known therapeutic compounds are used, and also as indicated to the skilled artisan by the in vitro responses or responses in animal models. Such dosages typically can be reduced by up to about an order of magnitude in concentration or amount without losing relevant biological activity. The actual dosage can depend upon the judgment of the physician, the condition of the patient, and the effectiveness of the therapeutic method based, for example, on the in vitro responsiveness of relevant cultured cells or histocultured tissue sample, such as biopsied malignant tumors, or the responses observed in the appropriate animal models. In various embodiments, the compositions of the invention comprising the agent (for example, any one or more of BPx1, BPx2, BPx3, BPx4 and/or a combination thereof, or analog, pharmaceutical equivalent or a peptidomimetic thereof) that increases release of gut hormones such as GLP-1, PYY or a combination thereof may be administered once a day (SID/QD), twice a day (BID), three times a day (TID), four times a day (QID), or more, so as to administer an effective amount to the subject, where the effective amount is any one or more of the doses described herein.

In various embodiments, the subject is selected from the group consisting of human, non-human primate, monkey, ape, dog, cat, cow, horse, rabbit, mouse and rat.

Also provided herein are methods for screening peptides for use in treatment of diabetes. The methods include providing one or more candidate peptides, fatty acids or botanical molecules found in food, contacting the candidate peptides, fatty acids or botanical molecules found in food to cells that secrete GLP-1 and determining whether the contact results in increased secretion of GLP-1. An increase in GLP-1 secretion indicates that the candidate peptide, fatty acid or botanical molecule found in food may be used in treatment of diabetes. In one embodiment, diabetes is type 2 diabetes. In some embodiments, the candidate peptides are bitter oligopeptides. In some embodiments, the methods include separately contacting each of a plurality of candidate peptides to be tested. In some embodiments, the plurality of candidate peptides comprises more than about $10^4$ samples. In some embodiments, the plurality of samples comprises more than about $5\times10^4$ samples. In some embodiments, cells that secrete GLP-1 are Hu-Tu80 cells. In exemplary embodiments, increase in secretion is relative to a reference value. The reference value may be a negative control (for example, absence of a candidate peptide) or the level of GLP-1 secretion in the presence of PTU or the level of GLP-1 secretion in the presence of the fatty acids described herein or a combination thereof. Other systems that test the ability of a ligand to interact with a receptor know to be on the L cell and responsible for regulating GLP-1 release can be used alternatively to HuTu80 cells.

Pharmaceutical Compositions

Provided herein are pharmaceutical compositions comprising, consisting of or consisting essentially of, therapeutic agents that increase release of gut hormones and an acceptable carrier/excipeint. In some embodiments, the therapeutic agents increase the release of any one or more of GLP-1, PYY or a combination thereof so as to treat diabetes in a subject in need thereof. In one embodiment, diabetes is Type 2 diabetes mellitus (T2DM). In one embodiment, the therapeutic agent is an oligopeptide. In another embodiment, the therapeutic agent is a small molecule. In some exemplary embodiments, the oligopeptides comprise, consist of or consist essentially of amino acid sequences YGLF (BPx1, SEQ ID NO: 1) or an analog, pharmaceutical equivalent or a peptidomimetic thereof, YPFPGPIPN (BPx2, SEQ ID NO: 2) or an analog, pharmaceutical equivalent or a peptidomimetic thereof, IPAVF (BPx3, SEQ ID NO: 3) or an analog, pharmaceutical equivalent or a peptidomimetic thereof, LLF (SEQ ID NO:4) or an analog, pharmaceutical equivalent or a peptidomimetic thereof or combinations thereof.

In various embodiments, the pharmaceutical compositions according to the invention may be formulated for delivery via any route of administration. "Route of administration" may refer to any administration pathway known in the art, including but not limited to aerosol, nasal, oral, transmucosal, transdermal, parenteral or enteral. In some embodiments, the pharmaceutical composition may be administered enterically to the small intestine. In some embodiments, the pharmaceutical composition may be administered orally. In some embodiments, the pharmaceutical composition may be administered to the colon by rectal suppository or enema. "Parenteral" refers to a route of administration that is generally associated with injection, including intraorbital, infusion, intraarterial, intracapsular, intracardiac, intradermal, intramuscular, intraperitoneal, intrapulmonary, intraspinal, intrasternal, intrathecal, intrauterine, intravenous, subarachnoid, subcapsular, subcutaneous, transmucosal, or transtracheal. Via the parenteral route, the compositions may be in the form of solutions or suspensions for infusion or for injection, or as lyophilized powders. Via the parenteral route, the compositions may be in the form of solutions or suspensions for infusion or for injection. Via the enteral route, the pharmaceutical compositions can be in the form of tablets, gel capsules, sugar-coated tablets, syrups, suspensions, solutions, powders, granules, emulsions, microspheres or nanospheres or lipid vesicles or polymer vesicles allowing controlled release.

The phrases "parenteral administration" and "administered parenterally" as used herein, refer to modes of administration other than enteral and topical administration, usually by injection. The phrases "systemic administration," "administered systemically", "peripheral administration" and "administered peripherally" as used herein refer to the administration of therapeutic agents that increase release of gut hormones other than directly into a target site, tissue, or organ, such that it enters the subject's circulatory system and, thus, is subject to metabolism and other like processes.

"Pharmaceutically acceptable excipient" means an excipient that is useful in preparing a pharmaceutical composition that is generally safe, non-toxic, and desirable, and includes excipients that are acceptable for veterinary use as well as for human pharmaceutical use. Such excipients may be solid, liquid, semisolid, or, in the case of an aerosol composition, gaseous.

The pharmaceutical compositions according to the invention can also contain any pharmaceutically acceptable carrier. "Pharmaceutically acceptable carrier" as used herein refers to a pharmaceutically acceptable material, composition, or vehicle that is involved in carrying or transporting a compound of interest from one tissue, organ, or portion of the body to another tissue, organ, or portion of the body. For example, the carrier may be a liquid or solid filler, diluent, excipient, solvent, or encapsulating material, or a combination thereof. Each component of the carrier must be "pharmaceutically acceptable" in that it must be compatible with the other ingredients of the formulation. It must also be suitable for use in contact with any tissues or organs with which it may come in contact, meaning that it must not carry a risk of toxicity, irritation, allergic response, immunogenicity, or any other complication that excessively outweighs its therapeutic benefits.

The pharmaceutical compositions according to the invention can also be encapsulated, tableted or prepared in an emulsion or syrup for oral administration. Pharmaceutically acceptable solid or liquid carriers may be added to enhance or stabilize the composition, or to facilitate preparation of the composition. Liquid carriers include syrup, peanut oil, olive oil, glycerin, saline, alcohols and water. Solid carriers include starch, lactose, calcium sulfate, dihydrate, terra alba, magnesium stearate or stearic acid, talc, pectin, acacia, agar or gelatin. The carrier may also include a sustained release material such as glyceryl monostearate or glyceryl distearate, alone or with a wax.

The pharmaceutical preparations are made following the conventional techniques of pharmacy involving milling, mixing, granulation, and compressing, when necessary, for tablet forms; or milling, mixing and filling for hard gelatin capsule forms. When a liquid carrier is used, the preparation will be in the form of syrup, elixir, emulsion or an aqueous or non-aqueous suspension. Such a liquid formulation may be administered directly p.o. or filled into a soft gelatin capsule.

The pharmaceutical compositions according to the invention may be delivered in a therapeutically effective amount. The precise therapeutically effective amount is that amount of the composition that will yield the most effective results in terms of efficacy of treatment in a given subject. This amount will vary depending upon a variety of factors, including but not limited to the characteristics of the therapeutic compound (including activity, pharmacokinetics, pharmacodynamics, and bioavailability), the physiological condition of the subject (including age, sex, disease type and stage, general physical condition, responsiveness to a given dosage, and type of medication), the nature of the pharmaceutically acceptable carrier or carriers in the formulation, and the route of administration. One skilled in the clinical and pharmacological arts will be able to determine a therapeutically effective amount through routine experimentation, for instance, by monitoring a subject's response to administration of a compound and adjusting the dosage accordingly. For additional guidance, see Remington: The Science and Practice of Pharmacy (Gennaro ed. 20th edition, Williams & Wilkins PA, USA) (2000).

The therapeutic agents described herein may be administered to the patient in a single dose or in multiple doses. When multiple doses are administered, the doses may be separated from one another by, for example, one hour, three hours, six hours, eight hours, one day, two days, one week, two weeks, or one month. For example, the therapeutic may be administered for, e.g., 2, 3, 4, 5, 6, 7, 8, 10, 15, 20, or more weeks. In various embodiments, the composition is administered to the subject 1-3 times per day or 1-7 times per week. In various embodiments, the composition is administered to the subject for 1-5 days, 1-5 weeks, 1-5 months, or 1-5 years. It is to be understood that, for any particular subject, specific dosage regimes should be adjusted over time according to the individual need and the professional judgment of the person administering or supervising the administration of the compositions. For example, the dosage of the therapeutic can be increased if the lower dose does not provide sufficient therapeutic activity. While the attending physician ultimately will decide the appropriate amount and dosage regimen, therapeutically effective amounts of the one or more peptides as disclosed herein or a mutant, variant, analog or derivative thereof may be provided at a dose of 0.0001, 0.01, 0.01 0.1, 1, 5, 10, 25, 50, 100, 500, or 1,000 mg/kg or µg/kg. Effective doses may be extrapolated from dose-response curves derived from in vitro or animal model test bioassays or systems.

An effective amount as used herein would also include an amount sufficient to delay the development of a symptom of the disease, alter the course of a symptom of disease (for example but not limited to, slow the progression of a symptom of the disease), or reverse a symptom of disease. Thus, it is not possible to specify the exact "effective amount". However, for any given case, an appropriate "effective amount" can be determined by one of ordinary skill in the art using only routine experimentation.

Effective amounts, toxicity, and therapeutic efficacy can be determined by standard pharmaceutical procedures in cell cultures or experimental animals, e.g., for determining the LD50 (the dose lethal to 50% of the population) and the ED50 (the dose therapeutically effective in 50% of the population). The dosage can vary depending upon the dosage form employed and the route of administration utilized. The dose ratio between toxic and therapeutic effects is the therapeutic index and can be expressed as the ratio LD50/ED50. Compositions and methods that exhibit large therapeutic indices are preferred. A therapeutically effective dose can be estimated initially from cell culture assays. Also, a dose can be formulated in animal models to achieve a circulating plasma concentration range that includes the IC50 (i.e., the concentration of the therapeutic agents that increase release of gut hormones, which achieves a half-maximal inhibition of symptoms) as determined in cell culture, or in an appropriate animal model. Levels in plasma can be measured, for example, by high performance liquid chromatography. The effects of any particular dosage can be monitored by a suitable bioassay. The dosage can be determined by a physician and adjusted, as necessary, to suit observed effects of the treatment.

The phrase "pharmaceutically acceptable" refers to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio. The phrase "pharmaceutically acceptable carrier" or "pharmaceutically acceptable excipient" as used herein means a pharmaceutically acceptable material, composition or vehicle, such as a liquid or solid filler, diluent, excipient, solvent, media, encapsulating material, manufacturing aid (e.g., lubricant, talc magnesium, calcium or zinc stearate, or steric acid), or solvent encapsulating material, involved in maintaining the stability, solubility, or activity of, therapeutic agents that increase release of gut hormones. Each carrier must be "acceptable" in the sense of being compatible with the other ingredients of the formulation and not injurious to the patient. Some examples of materials which can serve as pharmaceutically-acceptable carriers include: (1) sugars, such as lactose, glucose and sucrose; (2) starches, such as corn starch and potato starch; (3) cellulose, and its derivatives, such as sodium carboxymethyl cellulose, methylcellulose, ethyl cellulose, microcrystalline cellulose and cellulose acetate; (4) powdered tragacanth; (5) malt; (6) gelatin; (7) excipients, such as cocoa butter and suppository waxes; (8) oils, such as peanut oil, cottonseed oil, safflower oil, sesame oil, olive oil, corn oil and soybean oil; (9) glycols, such as propylene glycol; (10) polyols, such as glycerin, sorbitol, mannitol and polyethylene glycol (PEG); (11) esters, such as ethyl oleate and ethyl laurate; (12) agar; (13) buffering agents, such as magnesium hydroxide and aluminum hydroxide; (14) alginic acid; (15) pyrogen-free water; (16) isotonic saline; (17) Ringer's solution; (18) pH buffered solutions; (19) polyesters, polycarbonates and/or polyanhydrides; (20) bulking agents, such as polypeptides and amino acids (21) serum components, such as serum albumin, HDL and LDL; (22) C2-C12 alcohols, such as ethanol; and (23) other non-toxic compatible substances employed in pharmaceutical formulations. Release agents, coating agents, preservatives, and antioxidants can also be present in the formulation. The terms such as "excipient", "carrier", "pharmaceutically acceptable carrier" or the like are used interchangeably herein.

The therapeutic agents that increase release of gut hormones described herein can be specially formulated for administration of the compound to a subject in solid, liquid or gel form, including those adapted for the following: (1) parenteral administration, for example, by subcutaneous, intramuscular, intravenous or epidural injection as, for example, a sterile solution or suspension, or sustained-release formulation; (2) topical application, for example, as a cream, ointment, or a controlled-release patch or spray applied to the skin; (3) intravaginally or intrarectally, for example, as a pessary, cream or foam; (4) ocularly; (5) transdermally; (6) transmucosally; (7) enterically or (8) nasally. Additionally, the therapeutic agents that increase release of gut hormones described herein can be implanted into a patient or injected using a drug delivery system. See, for example, Urquhart, et al., Ann. Rev. Pharmacol. Toxicol. 24: 199-236 (1984); Lewis, ed. "Controlled Release of Pesticides and Pharmaceuticals" (Plenum Press, New York, 1981); U.S. Pat. Nos. 3,773,919; and 3,270,960.

Further embodiments of the formulations and modes of administration of therapeutic agents that increase release of gut hormones that can be used in the methods described herein are illustrated below.

Parenteral Dosage Forms. Parenteral dosage forms of therapeutic agents that increase release of gut hormones can also be administered to a subject by various routes, including, but not limited to, subcutaneous, intravenous (including bolus injection), intramuscular, and intra-arterial. Since administration of parenteral dosage forms typically bypasses the patient's natural defenses against contaminants, parenteral dosage forms are preferably sterile or capable of being sterilized prior to administration to a patient. Examples of parenteral dosage forms include, but are not limited to, solutions ready for injection, dry products ready to be dissolved or suspended in a pharmaceutically acceptable vehicle for injection, suspensions ready for injection, controlled-release parenteral dosage forms, and emulsions.

Suitable vehicles that can be used to provide parenteral dosage forms of the disclosure are well known to those skilled in the art. Examples include, without limitation: sterile water; water for injection USP; saline solution; glucose solution; aqueous vehicles such as but not limited to, sodium chloride injection, Ringer's injection, dextrose Injection, dextrose and sodium chloride injection, and lactated Ringer's injection; water-miscible vehicles such as, but not limited to, ethyl alcohol, polyethylene glycol, and propylene glycol; and non-aqueous vehicles such as, but not limited to, corn oil, cottonseed oil, peanut oil, sesame oil, ethyl oleate, isopropyl myristate, and benzyl benzoate.

Aerosol formulations therapeutic agents that increase release of gut hormones can be packaged in a pressurized aerosol container together with suitable propellants, for example, hydrocarbon propellants like propane, butane, or isobutane with conventional adjuvants therapeutic agents that increase release of gut hormones can also be administered in a non-pressurized form such as in a nebulizer or atomizer. Therapeutic agents that increase release of gut hormones can also be administered directly to the airways in the form of a dry powder, for example, by use of an inhaler.

Suitable powder compositions include, by way of illustration, powdered preparations of therapeutic agents that increase release of gut hormones thoroughly intermixed with lactose, or other inert powders acceptable for intra-bronchial administration. The powder compositions can be administered via an aerosol dispenser or encased in a breakable capsule which can be inserted by the subject into a device that punctures the capsule and blows the powder out in a steady stream suitable for inhalation. The compositions can include propellants, surfactants, and co-solvents and can be filled into conventional aerosol containers that are closed by a suitable metering valve.

Aerosols for the delivery to the respiratory tract are known in the art. See for example, Adjei, A. and Garren, J. Pharm. Res., 1: 565-569 (1990); Zanen, P. and Lamm, J.-W. J. Int. J. Pharm., 114: 111-115 (1995); Gonda, I. "Aerosols for delivery of therapeutic an diagnostic agents to the respiratory tract," in Critical Reviews in Therapeutic Drug Carrier Systems, 6:273-313 (1990); Anderson et al., Am. Rev. Respir. Dis., 140: 1317-1324 (1989)) and have potential for the systemic delivery of peptides and proteins as well (Patton and Platz, Advanced Drug Delivery Reviews, 8:179-196 (1992)); Timsina et. al., Int. J. Pharm., 101: 1-13 (1995); and Tansey, I. P., Spray Technol. Market, 4:26-29 (1994); French, D. L., Edwards, D. A. and Niven, R. W., Aerosol Sci., 27: 769-783 (1996); Visser, J., Powder Technology 58: 1-10 (1989)); Rudt, S. and R. H. Muller, J. Controlled Release, 22: 263-272 (1992); Tabata, Y, and Y. Ikada, Biomed. Mater. Res., 22: 837-858 (1988); Wall, D. A., Drug Delivery, 2: 10 1-20 1995); Patton, J. and Platz, R., Adv. Drug Del. Rev., 8: 179-196 (1992); Bryon, P., Adv. Drug. Del. Rev., 5: 107-132 (1990); Patton, J. S., et al., Controlled Release, 28: 15 79-85 (1994); Damms, B. and Bains, W., Nature Biotechnology (1996); Niven, R. W., et al., Pharm. Res., 12(9); 1343-1349 (1995); and Kobayashi, S., et al., Pharm. Res., 13(1): 80-83 (1996), contents of all of which are herein incorporated by reference in their entirety.

The formulations of the therapeutic agents that increase release of gut hormones described herein further encompass anhydrous pharmaceutical compositions and dosage forms comprising the disclosed compounds as active ingredients, since water can facilitate the degradation of some compounds. For example, the addition of water (e.g., 5%) is widely accepted in the pharmaceutical arts as a means of simulating long-term storage in order to determine characteristics such as shelf life or the stability of formulations over time. See, e.g., Jens T. Carstensen, Drug Stability: Principles & Practice, 379-80 (2nd ed., Marcel Dekker, NY, N.Y.: 1995). Anhydrous pharmaceutical compositions and dosage forms of the disclosure can be prepared using anhydrous or low moisture containing ingredients and low moisture or low humidity conditions. Pharmaceutical compositions and dosage forms that comprise lactose and at least one active ingredient that comprise a primary or secondary amine are preferably anhydrous if substantial contact with moisture and/or humidity during manufacturing, packaging, and/or storage is expected. Anhydrous compositions are preferably packaged using materials known to prevent exposure to water such that they can be included in suitable formulary kits. Examples of suitable packaging include, but are not limited to, hermetically sealed foils, plastics, unit dose containers (e.g., vials) with or without desiccants, blister packs, and strip packs.

Controlled and Delayed Release Dosage Forms. In some embodiments of the methods described herein, therapeutic agents that increase release of gut hormones can be administered to a subject by controlled- or delayed-release means. Ideally, the use of an optimally designed controlled-release preparation in medical treatment is characterized by a minimum of drug substance being employed to cure or control the condition in a minimum amount of time. Advantages of controlled-release formulations include: 1) extended activity of the drug; 2) reduced dosage frequency; 3) increased patient compliance; 4) usage of less total drug; 5) reduction in local or systemic side effects; 6) minimization of drug accumulation; 7) reduction in blood level fluctuations; 8)

improvement in efficacy of treatment; 9) reduction of potentiation or loss of drug activity; and 10) improvement in speed of control of diseases or conditions. (Kim, Cherng-ju, Controlled Release Dosage Form Design, 2 (Technomic Publishing, Lancaster, Pa.: 2000)). Controlled-release formulations can be used to control a compound's onset of action, duration of action, plasma levels within the therapeutic window, and peak blood levels. In particular, controlled- or extended-release dosage forms or formulations can be used to ensure that the maximum effectiveness of a compound of formula (I) is achieved while minimizing potential adverse effects and safety concerns, which can occur both from under-dosing a drug (i.e., going below the minimum therapeutic levels) as well as exceeding the toxicity level for the drug.

A variety of known controlled- or extended-release dosage forms, formulations, and devices can be adapted for use with the therapeutic agents that increase release of gut hormones described herein. Examples include, but are not limited to, those described in U.S. Pat. Nos. 3,845,770; 3,916,899; 3,536,809; 3,598,123; 4,008,719; 5,674,533; 5,059,595; 5,591,767; 5,120,548; 5,073,543; 5,639,476; 5,354,556; 5,733,566; and 6,365,185 B1, each of which is incorporated herein by reference in their entireties. These dosage forms can be used to provide slow or controlled-release of one or more active ingredients using, for example, hydroxypropylmethyl cellulose, other polymer matrices, gels, permeable membranes, osmotic systems (such as OROS® (Alza Corporation, Mountain View, Calif. USA)), multilayer coatings, microparticles, liposomes, or microspheres or a combination thereof to provide the desired release profile in varying proportions. Additionally, ion exchange materials can be used to prepare immobilized, adsorbed salt forms of the disclosed compounds and thus effect controlled delivery of the drug. Examples of specific anion exchangers include, but are not limited to, Duolite® A568 and Duolite® AP143 (Rohm&Haas, Spring House, Pa. USA).

In some embodiments, therapeutic agents that increase release of gut hormones for use in the methods described herein are administered to a subject by sustained release or in pulses. Pulse therapy is not a form of discontinuous administration of the same amount of a composition over time, but comprises administration of the same dose of the composition at a reduced frequency or administration of reduced doses. Sustained release or pulse administrations are particularly preferred when the disorder occurs continuously in the subject, for example where the subject has continuous or chronic symptoms of a viral infection. Each pulse dose can be reduced and the total amount of the i therapeutic agents that increase release of gut hormones administered over the course of treatment to the patient is minimized.

The interval between pulses, when necessary, can be determined by one of ordinary skill in the art. Often, the interval between pulses can be calculated by administering another dose of the composition when the composition or the active component of the composition is no longer detectable in the subject prior to delivery of the next pulse. Intervals can also be calculated from the in vivo half-life of the composition. Intervals can be calculated as greater than the in vivo half-life, or 2, 3, 4, 5 and even 10 times greater the composition half-life. Various methods and apparatus for pulsing compositions by infusion or other forms of delivery to the patient are disclosed in U.S. Pat. Nos. 4,747,825; 4,723,958; 4,948,592; 4,965,251 and 5,403,590.

Kits of the Invention

The invention also provides a kit for the treating, inhibiting and/or reducing the severity of diabetes (for example, type 2 diabetes) in a subject in need thereof. The kit comprises a composition comprising therapeutic agents that increase release of gut hormones and instructions for use of the composition for treating, inhibiting and/or reducing the severity of diabetes in subjects in need thereof. In some embodiments, the therapeutic agents that increase release of gut hormones are oligopeptides wherein the oligopeptides comprise, consist of or consist essentially of amino acid sequences YGLF (SEQ ID NO: 1) or an analog, pharmaceutical equivalent or a peptidomimetic thereof, YPFPGPIPN (SEQ ID NO: 2) or an analog, pharmaceutical equivalent or a peptidomimetic thereof, IPAVF (SEQ ID NO: 3) or an analog, pharmaceutical equivalent or a peptidomimetic thereof, LLF (SEQ ID NO:4) or an analog, pharmaceutical equivalent or a peptidomimetic thereof or combinations thereof.

The kit is an assemblage of materials or components, including at least one of the compositions described herein. Thus, in some embodiments the kit contains a composition including oligopeptides wherein the oligopeptides comprise, consist of or consist essentially of amino acid sequences YGLF (SEQ ID NO: 1) or an analog, pharmaceutical equivalent or a peptidomimetic thereof, YPFPGPIPN (SEQ ID NO: 2) or an analog, pharmaceutical equivalent or a peptidomimetic thereof, IPAVF (SEQ ID NO: 3) or an analog, pharmaceutical equivalent or a peptidomimetic thereof, LLF (SEQ ID NO:4) or an analog, pharmaceutical equivalent or a peptidomimetic thereof or combinations thereof, or combinations of any one or more of thereof.

The exact nature of the components configured in the inventive kit depends on its intended purpose. In one embodiment, the kit is configured particularly for human subjects. In further embodiments, the kit is configured for veterinary applications, treating subjects such as, but not limited to, farm animals, domestic animals, and laboratory animals.

Instructions for use may be included in the kit. "Instructions for use" typically include a tangible expression describing the technique to be employed in using the components of the kit to effect a desired outcome, such as to treat, inhibit, reduce the severity of diabetes in a subject. Optionally, the kit also contains other useful components, such as, measuring tools, diluents, buffers, pharmaceutically acceptable carriers, syringes or other useful paraphernalia as will be readily recognized by those of skill in the art.

The materials or components assembled in the kit can be provided to the practitioner stored in any convenient and suitable ways that preserve their operability and utility. For example the components can be in dissolved, dehydrated, or lyophilized form; they can be provided at room, refrigerated or frozen temperatures. The components are typically contained in suitable packaging material(s). As employed herein, the phrase "packaging material" refers to one or more physical structures used to house the contents of the kit, such as inventive compositions and the like. The packaging material is constructed by well-known methods, preferably to provide a sterile, contaminant-free environment. As used herein, the term "package" refers to a suitable solid matrix or material such as glass, plastic, paper, foil, and the like, capable of holding the individual kit components. Thus, for example, a package can be a bottle used to contain suitable quantities of an inventive composition containing a the pharmaceutical compositions as described herein. The packaging material generally has an external label which indicates the contents and/or purpose of the kit and/or its components.

EXAMPLES

The following examples are provided to better illustrate the claimed invention and are not to be interpreted as limiting the scope of the invention. To the extent that specific materials are mentioned, it is merely for purposes of illustration and is not intended to limit the invention. One skilled in the art may develop equivalent means or reactants without the exercise of inventive capacity and without departing from the scope of the invention.

Example 1

Experimental Methods
The human ileum tissues from Cedars-Sinai Biobank using IRB protocol 34332 were analyzed by using immunohistochemistry methods for co-localization of TAS2R38 with GLP-1 to see if the receptor was present in the L-cells. In a parallel study, the previously determined structure of the taster haplotype PAV of TAS2R38 [J. Tan, et al, 3rd, 3D Structure Prediction of TAS2R38 Bitter Receptors Bound to Agonists Phenylthiocarbamide (PTC) and 6-n-Propylthiouracil (PROP), J Chem Inf Model 52 (2012) 1875-1885] was used in a structure-based virtual ligand screening of purchasable compounds from the ZINC database [J. J. Irwin, T et al, ZINC: a free tool to discover chemistry for biology, J Chem Inf Model 52 (2012) 1757-1768]. Three of the top hit molecules were purchased and tested in in vitro assays utilizing HuTu-80 cells and in vivo assays for their potential of GLP-1 release. One of the molecules was also tested with a TAS2R38 knockout cells. The methods and materials used for these studies are described below.

Immunohistochemistry
The experiments were designed to determine if the TAS2R38 receptor is expressed on the human enteroendocrine L-cells. To identify if it is co-localized with GLP-1 on the native L-cells, we performed IHC using previously validated GPCR and GLP-1 antibodies by double immune-staining on human GI tissues. The antibodies used were: TAS2R38 [rabbit polyclonal (H: ab65509, Abeam)], GLP-1 [goat polyclonal (sc-26637, Santa Cruz Biotechnology)]. The numbers of cells staining GLP-1 or TAS2R38, or both were counted visually.

Virtual Ligand Screening
We used the PTU-bound PAV conformation predicted previously [36] in a virtual ligand screen (VLS) study using the DOCK Blaster server [38] which has access to several compound libraries including one with ~2 million commercially available compounds from the ZINC database [J. J. Irwin, et al, ZINC: A Free Tool to Discover Chemistry for Biology, J Chem Inf Model (2012)]. For each ligand molecule, this server docks multiple ligand conformations corresponding to its internal torsional degrees of freedom into a putative binding site provided by the user and ranks the molecules by a scoring function. We took the top 500 hits from this server and prioritize them using a more accurate scoring function based on an all-atom Dreiding force field [S. L. Mayo, B. D. Olafson, W. A. Goddard, Dreiding—a Generic Force-Field for Molecular Simulations, Journal of Physical Chemistry 94 (1990) 8897-8909] to select top 200 diverse small molecules corresponding to different chemical scaffolds. We selected top 15 molecules from this list and purchased three of them for further studies.

Figure 4A:
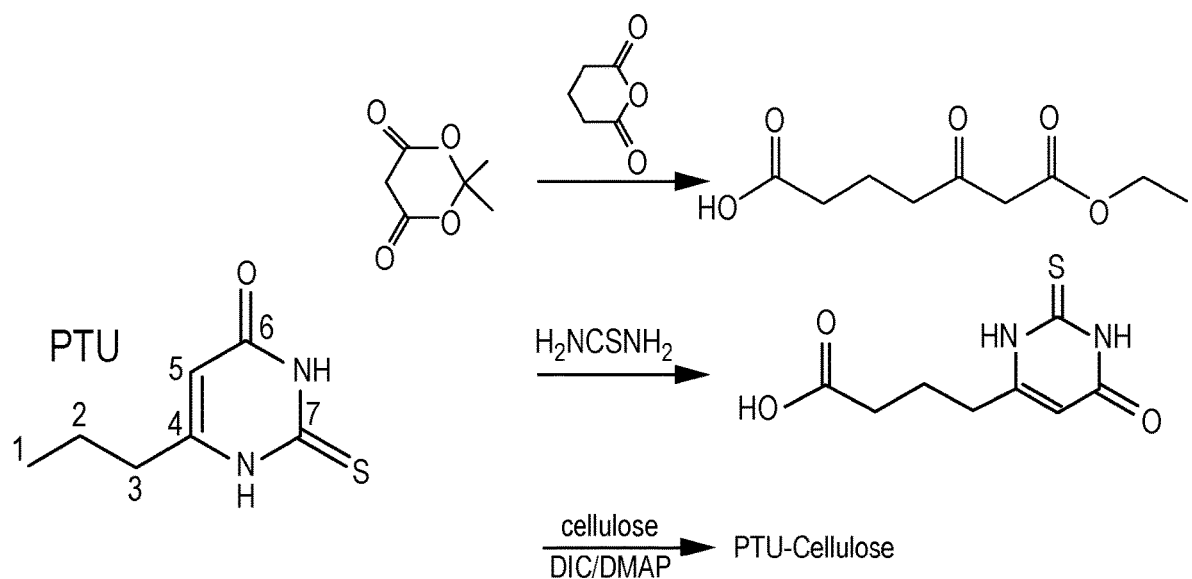
FIG. 4A-FIG. 4B depict in accordance with various embodiments of the invention, GLP-1 release in mice treated with PTU-cellulose, PTU or cellulose.

PTU-Cellulose Synthesis
The synthesis reaction is summarized in FIG. 4A. PTU with a carboxyl group substituted for a methyl group was synthesized by first doing a claisen condensation of 2,2-Dimethyl-1,3-dioxane-4,6-dione with glutaric anhydride yielding 7-ethoxy-5,7-dioxoheptanoic acid, whose condensation reaction with thiourea results in the carboxyl-substituted PTU. It is then conjugated to the hydroxyl groups of cellulose using N, N'-diisopropylcarbodiimide (DIC) and 4-dimethylaminopyridine (DMAP) in the DMSO. The structure of the product was confirmed by using IR spectroscopic methods.

In Vitro Studies
  a. GLP-1 Release.
  HuTu-80 cells (HTB-40, ATCC) were propagated in Dulbecco's modified Eagle's medium (DMEM) containing 4 mM L-glutamine, 1.5 g/L sodium bicarbonate, and 4.5 g/L glucose, supplemented with 10% FBS and PSG antibiotic mix and maintained at 10% $CO_2$ and 37° C. For experiments, these cells were seeded in 6-well plates or 100-mm$^2$ tissue culture dishes, propagated to confluence (5-7 days) and arrested in serum-free media overnight prior to treatments. Prior to the experiment, spent media was replaced with OPTI-MEM (Gibco, Life Technologies, Grand Island, NY) containing Halt Protease and Phosphatase Inhibitor cocktail (Thermo Fisher Scientific, Rockford, IL) and individual wells dosed for 30 min. For the experiments, we determined dose dependent GLP-1 release from the HuTu-80 cells into the media. The media from cells was collected and frozen for subsequent peptide hormone release measurement using a Luminex MAGPIX metabolism multiplexing assay kit (HMHMAG-34K) following the manufacturer's instructions.
  b. Inhibition of GPCR Expression.
  In order to determine the specific GPCR mediating the response of a particular ligand, we performed in vitro RNA silencing of TAS2R38. RNA silencing was performed using a commercial kit (FlexiTube siRNA, Qiagen) consisting of 4 predesigned oligonucleotides that specifically target each gene transcript. Each kit also had accompanying controls and quantifying assays for detection of gene knockdown. Cultured HuTu-80 cells were transfected with single and mixed oligonucleotide siRNAs for TAS2R38 using HiPerFect transfection reagent (Qiagen) or Lipofectamine 2000 (Life Tech) according to the procedure recommended by the manufacturer. Cells were maintained in the basal medium for up to 48 h. Gene knockdown was evaluated by RT-qPCR and Western blot by suitable antibody to ensure inhibition occurred. In the parallel set of transfected HuTu-80 cells, effective dose of specific ligand was used to stimulate GLP-1 release. Dose-response curve of the ligand with and without siRNA treatment was generated.

In Vivo Studies
The ligands being tested were administered by gastric gavage to pathogen-free, 6- to 8-week-old male BALB/c mice: predicted ligands, PTU-cellulose conjugate; PTU at the same amount calculated to be in the PTU-cellulose; or cellulose alone. Retro-orbital blood was obtained and GLP-1 was measured at regular intervals.

Example 2

Presence of GPCR Sensors Modulating GLP-1/PYY Release on the Luminal Surface of L Cells in Human Intestinal Tissue from Bariatric Surgery Patients Using Immunohistochemical (IHC) and/or In Situ Hybridization (ISH) Techniques Members of TAS2R and FFAR GPCR subfamilies are functionally expressed on human L-cell lines (HuTu-80 and H716 cells) and detectable in intestinal tissue by RT-PCR analysis. The use of immunohistochemistry methods on human GI tissue from ileum and colon using the Cedars-Sinai Medical Center BioBank and its Microscopy Core identified many L-cells based on staining with antibody for GLP-1. Several of these L-cells showed GLP-1 co-localization with the bitter taste receptor TAS2R38, or the fatty acid receptor GPR40 (FFAR1)4, or the somatostatin receptor SSTR2, determined based on respective receptor antibodies. The receptors are found predominantly on the surface of the cell and GLP-1 is found in cytoplasmic granules in these cells. These co-localization data show a role of these receptors in the modulation of GLP-1 release from L-cells.

The somatostatin receptor subtype 5 (SSTR5), has been shown in animal models to be used by GLP-1 to regulate itself (through paracrine signaling) by inducing neighboring D-cells to release somatostatin, which inhibits incretin release from the L-cells. A model showing this is shown in FIG. 1, which suggests the use of a somatostatin antagonist to enhance GLP-1 release. While the inventors did not find SSTR5 receptor in the human ileum L-cells, another subtype, SSTR2 was detected on the apical surface of the L cell. This suggests that there are ligands created within the intestinal lumen that regulate L cell GLP-1 secretory responses. These ligands may be digestion products of food or products of actions by bacteria that reside in the intestinal lumen. Others have identified the GLP-1 receptor in the human gastrointestinal mucosa and enteric neurons, which can potentially mediate this paracrine signaling on the D-cell. As described herein, SSTR2 ligands can be used to regulate GLP-1 release from L-cells. Specifically, SSTR2 agonists alone and in combination with bitter oligopeptides can be used to modulate the levels of GLP-1 release. In addition, agents that act as SSTR2 antagonists alone and in combination with bitter oligopeptides, fatty acids and/or botanical molecules in food can be used to enhance the GLP-1 release from L-cells.

Molecular Structures of L-Cell Gpcrs Identified, Bound to Oligopeptides to Guide In Vitro and In Vivo Studies The inventors have used validated computational methods to predict structures of tastant-bound bitter taste receptor TAS2R38, which were used to identify small molecules from a large library of molecules, that were subsequently shown to cause GLP-1 release in both in vitro and in vivo studies. Use of these methods to predict ligands/peptides in combination with experiments provides the most efficient way to probe mechanisms.

The atomic-level structure prediction of the bitter taste receptor TAS2R38 required consideration of known haplotypes (taster and non-taster as described below) of the receptor. Phenylthiocarbamide (PTC) and 6-n-propylthiouracil (PTU) are two potent and specific agonists for TAS2R38. PTC is intensely bitter for some individuals, but is largely tasteless for others, which has been traced to 2 common forms of the TAS2R38 gene which exhibit single-nucleotide polymorphisms (SNPs) at 3 sites: a) amino acid (AA) position 49, where Pro/Ala is encoded; b) AA position 262, where Ala/Val is encoded; and c) AA position 296, where Val/Ile is encoded. These changes give rise to two frequent haplotypes, hTAS2R38PAV and hTAS2R38AVI, where, hTAS2R38PAV shows a strong response at µM concentrations for PTC, and hTAS2R38AVI does not respond to PTC. Mutational analysis has shown amino acid positions 49 and 262 to be critical for the cellular response. To address the molecular differences between bitter taster and non-taster populations based on the hTAS2R38 receptor and the corresponding activation mechanism by its agonists PTC and PTU, the Inventors used their own computational methods to predict the atomic level structures for a range of bitter taste receptor haplotypes: from the taster hTAS2R38PAV to the non-taster hTAS2R38AVI (non-taster).

Figure 2:
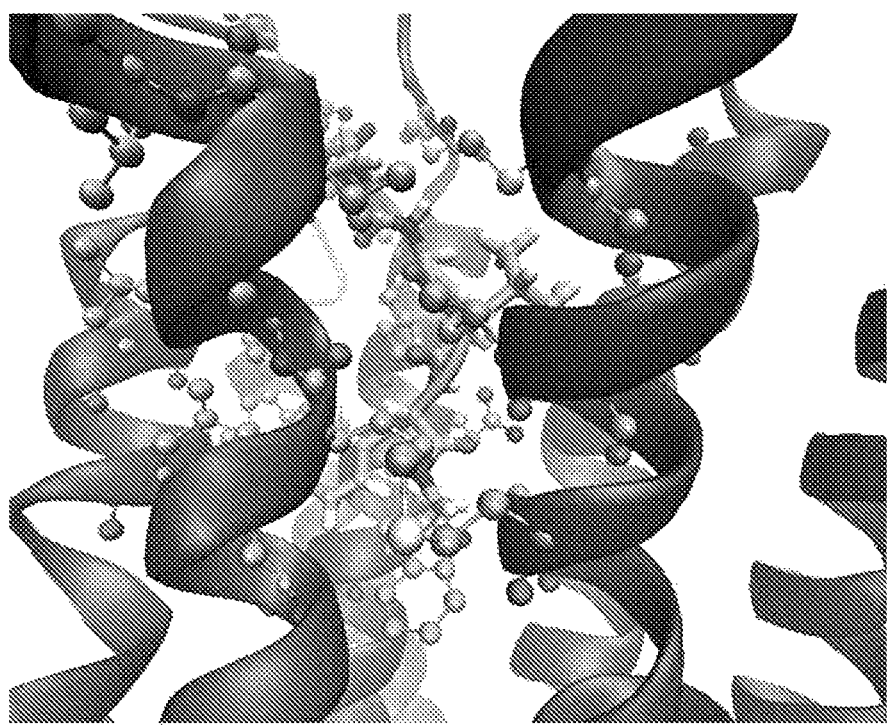
FIG. 2 depicts in accordance with various embodiments of the invention, binding pocket for α-lactorphin tetrapeptide (cyan) in bitter taste receptor TAS2R38.

The Inventors then used GenDock methodology to predict the binding sites and binding affinity for PTC and PTU to the predicted atomic structures of both taster and non-taster receptor forms. Both PTC and PTU form a stable H-bond with residue 262 of the taster (hTAS2R38PAV) receptor form and not with that of the non-taster (hTAS2R38AVI) receptor form. So, this residue appears to be very important for PTC/TAS2R38 taster differences consistent with experiments. Recently, the Inventors docked one of the bitter oligopeptides (α-lactorphin) to TAS2R38. The binding pocket is shown in FIG. 2.

Studies Using an In Vitro Model of L Cells and In Vivo Studies Using Mouse Models to Validate the Role of Receptor Based Mechanisms Mediating the Effects of Oligopeptides These studies were performed with HuTu-80 cells, which are excellent models of the enteroendocrine L-cells. Previous studies demonstrated that at least 17 TAS2R family members are expressed in human colonic tissue, while 11 of them are also detected in the HuTu-80 cells. Further, these cells respond to bitter ligands like PTC ligands with GLP-1 release. To confirm that the receptors are present for this project, RT-PCR analysis was performed. HuTu-80 cell cDNA was used as the template to detect the presence of TAS2R and FFAR transcripts by RT-PCR. Transcripts of TAS2R, FFAR and L-cell markers, glucagon (GCG)/GLP-1, PYY and Chromogranin A (CgA) were readily detectable at basal level in these cells making them suitable for the in vitro studies in this proposal.

Figure 3:
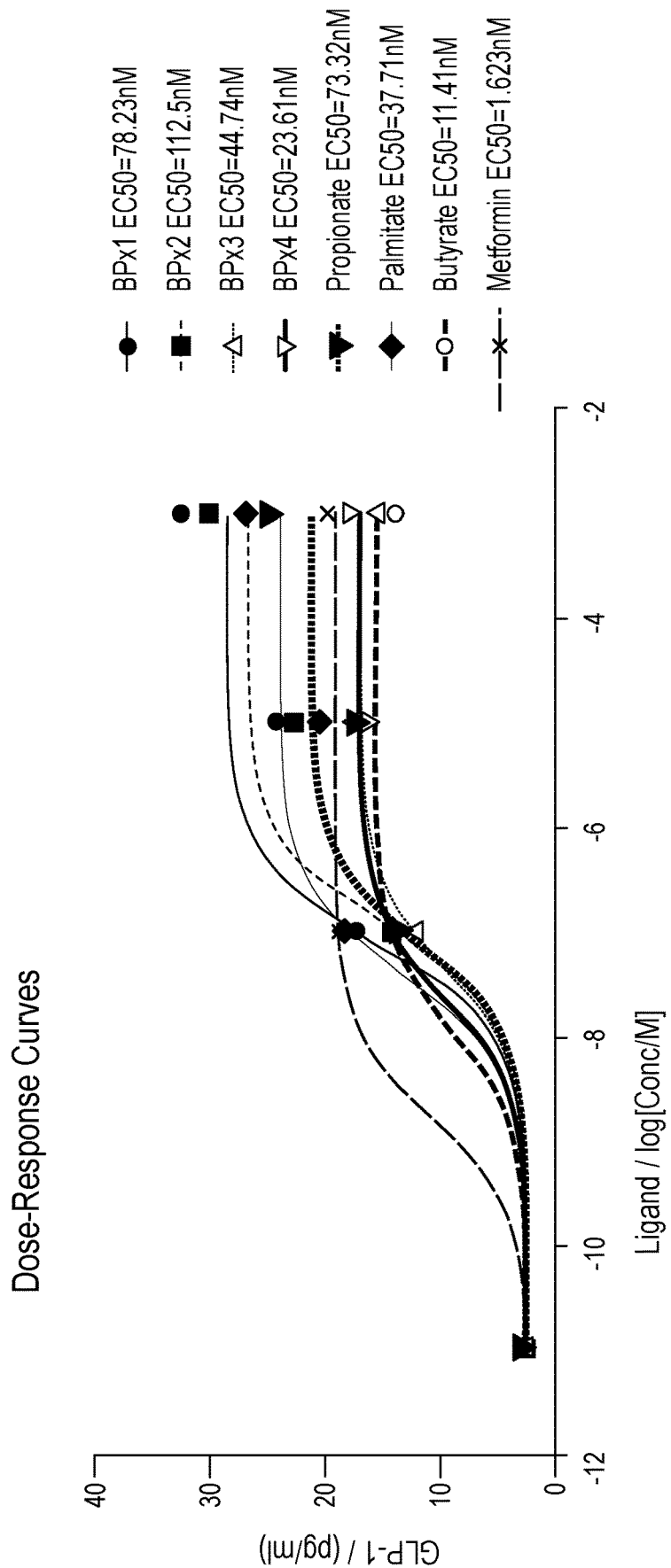
FIG. 3 depicts in accordance with various embodiments of the invention, dose-response data for GLP-1 release from HuTu-80 cells for bitter oligopeptides (BPx1=YGLF (SEQ ID NO: 1), BPx2=YPFPGPIPN (SEQ ID NO:2), BPx3-IPAVF (SEQ ID NO:3), BPx4=LLF (SEQ ID NO: 4)), fatty acid ligands and metformin.

GLP-1 release assay was performed using HuTu-80 cells exposed to bitter oligopeptides from milk protein and fatty acid ligands. FIG. 3 show a dose response effect for each of the ligands demonstrating for the first time that bitter oligopeptides derived from digestion of meal proteins can activate GLP-1 release. GLP-1 secretory response was also observed in response to fatty acids propionate and butyrate known to activate FFAR3, as well as palmitate known to activate FFAR1. Finally, the results show that metformin can activate GLP-1 release consistent with recent reports and suggesting the metformin's effects are in part mediated by receptors on the L cell. The results indicate that HuTu80 cells provide a great platform for receptor-linked GLP-1 secretion.

Figure 4B:
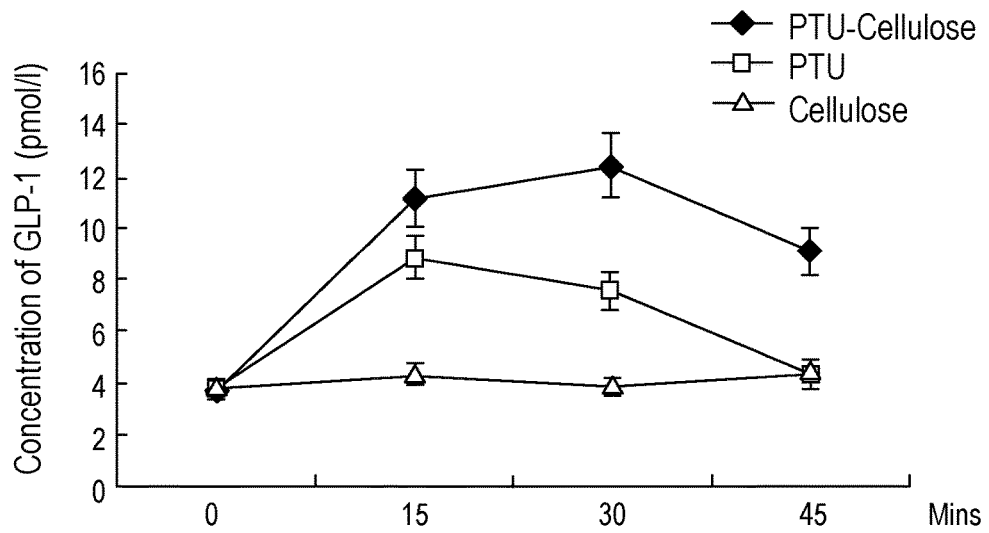

In order to determine if a TAS2R38 receptor specific agonist (PTU) could activate L-cell secretion of GLP-1 in an animal, PTU or a PTU-cellulose conjugate (calculated to give the same number of PTU molecules) were administered. The purpose of the conjugate was to keep the PTU in the lumen of the intestine in order to demonstrate that the activity of PTU to cause GLP-1 release was due to luminal surface interaction with the TAS2R38 receptor. The molecules were administered by gastric gavage to pathogen-free, 6-to-8-week-old male BALB/c mice. Retro-orbital blood was obtained and GLP-1 was measured at regular intervals (FIG. 4B). The results demonstrated that both PTU and the PTU-conjugate caused GLP-1 release into the blood, and the increase with the PTU conjugate was greater in magnitude and longer in duration than the PTU alone. The cellulose alone had no effect. These results show release of GLP-1 with an agonist to TAS2R38 by gastric gavage administration. Using structural analysis, novel molecules were identified that could interact with TAS2R38 to cause GLP-1 release in HuTu80 cells. These molecules were administered to mice by gastric gavage and they caused GLP-1 release in mice. This result again validated the Inventors' modeling methods for ligand associations for specific receptors.

Synthesis of the Most Effective and Potent Bitter Peptide in a GMP Facility, Combine it with FDA-Approved Formulations Shown to Provide Colon/Ileum-Targeted Delivery, and Encapsulate it for Administration to Prediabetic Patients For in vitro testing of the bitter oligopeptides, the Inventors had outsourced the synthesis of 10 mg of each of the 4 peptides (BPx1 through BPx4). The most potent of the oligopeptides BPx1 and BPx2 based on in vivo studies (FIG. 3) in mice will be synthesized in a Good Manufacturing Practices (GMP) facility in medium quantities (<100 gms).

Example 3

The use of immunohistochemistry methods on human GI tissue from ileum and colon using the Cedars-Sinai Medical Center BioBank and its Microscopy Core identified many cells co-localized with TAS2R38 and GLP-1. We considered cells staining with antibody to GLP-1 to be L cells. GLP-1 co-localized with TAS2R38, which is seen predominantly on the surface of the cell and in higher levels facing the lumen. In addition, visual counting of stained cells covering ileum and colon tissue showed that ~8% of ileum L-cells and ~12% of colon L-cells had staining for TAS2R38. The detailed numbers are shown in Table 1. These should be considered as qualitative numbers as it was challenging to get a quantitative count of co-localization due to the small surface area of the apical and lumen facing surface of the pyramidal shaped L cells.

The PTU-cellulose conjugate was tested to see if the GLP-1 release can be sustained by slowing the absorption of PTU from the GI tract. Because the target receptor is accessible from the lumen, the potential drug molecules don't need to be systemically distributed for their pharmacological action. The results in FIG. 4B demonstrated that both PTU and the PTU-cellulose caused GLP-1 release into the blood, and the increase with the PTU-cellulose was greater in magnitude and longer in duration than the PTU alone. The cellulose alone had no effect. PTU-cellulose data shows that functionalizing PTU to reduce absorption can enhance the GLP-1 release, suggesting that gut restriction of potential drugs can be used to control GLP-1 release, in addition to minimizing side-effects arising from systemic circulation.

These data indicate that activating TAS2R38 causes release of the gut peptide hormone GLP-1, making TAS2R38 a novel diabetes target as agents that increase GLP-1 levels and GLP-1 analogs are effective in diabetes management. These data suggest a complex set of signaling cascades that can modulate the release of gut peptides and potentially cause metabolic effects. This also makes the nutrient receptors very attractive therapeutic targets for metabolic diseases with abnormal gut peptide signaling. From the context of TAS2R38 described in this study, bitter (but safe) components of food that can activate this receptor can become promising therapeutic candidates. The results for TAS2R38 receptor presented in this study open the possibility to screen and identify novel "bitter" molecules that can activate this receptor and cause desirable metabolic effects especially for diabetes resolution.

Example 4

GLP-1 Release by Botanical Bitter Compounds and Fatty Acid Ligands

We also performed a GLP-1 release assay on the HuTu-80 cells exposed to botanical bitter compounds, fatty acid

TABLE 1

The number of cells that stain for TAS2R38 only, GLP-1, and co-localized for ileum tissue (first four rows) and colon

| Human Tissue | # of sections used | Magnification of image | # of cells Stained by TAS2R38 only | # of cells Stained by GLP-1 | # of cells co-stained by TAS2R38 and GLP-1 | Percent co-stained L-cells |
|---|---|---|---|---|---|---|
| A6, SB | 5 | 20x | 22 | 53 | 7 | 13.2 |
| A23, SB | 5 | 20x | 18 | 80 | 8 | 10 |
| B2, SB | 5 | 20x | 32 | 61 | 1 | 1.64 |
| P12003-24, SB | 5 | 20x | 15 | 31 | 2 | 6.45 |
| Colon | 5 | 20x | 52 | 17 | 2 | 11.7 |

Figure 5:
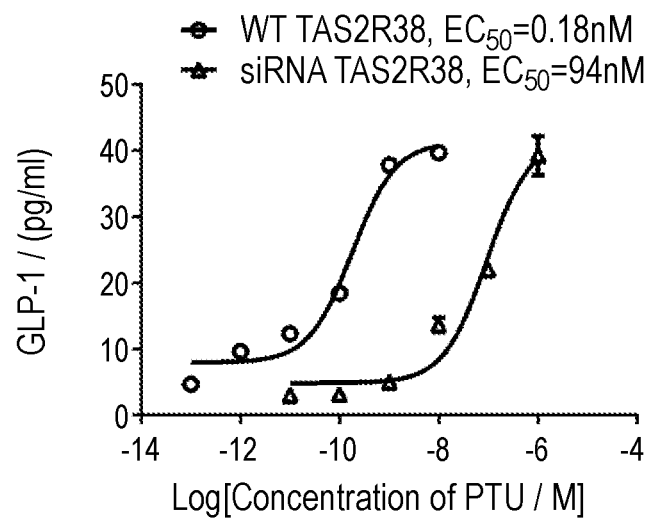
FIG. 5 depicts in accordance with various embodiments of the invention, stimulation of GLP-1 release by the known TAS2R38 ligand PTU in cultured HuTu-80 cells, which were untreated or treated with vehicle and indicated concentrations for 30 min. Conditioned media were collected and frozen until GLP-1 measurement. Values are mean±SE, N=2 (PTU). GLP-1 is measured using Luminex assay.
Figure 6:
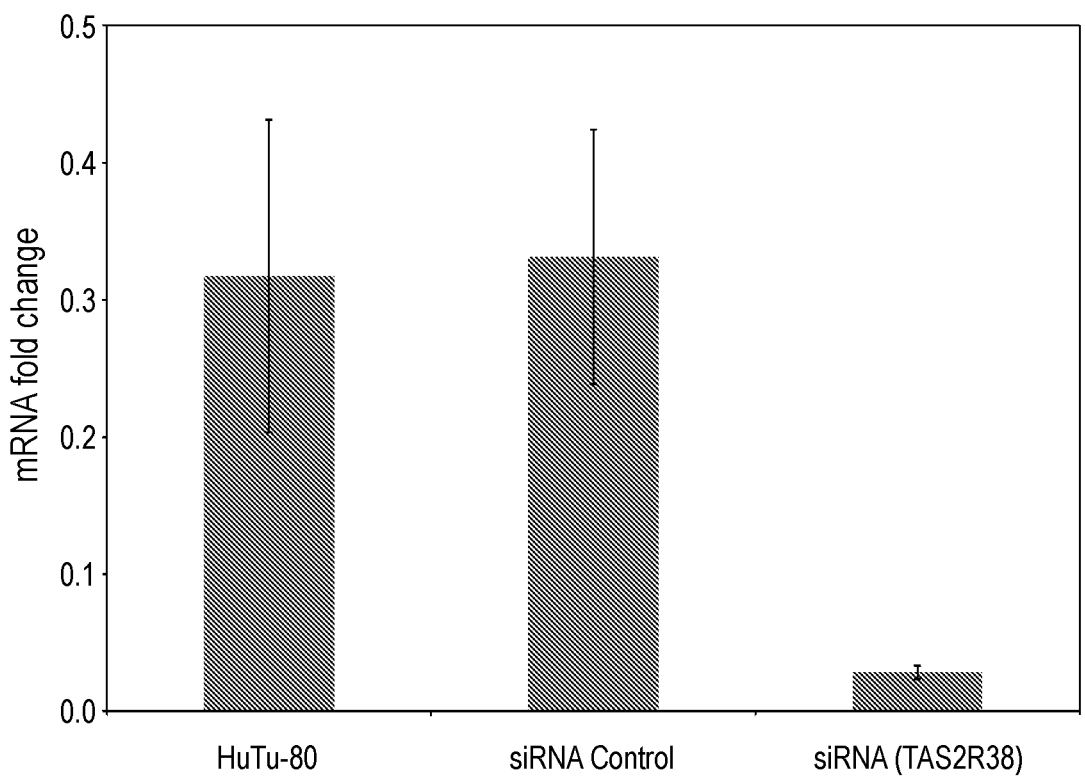
FIG. 6 depicts in accordance with various embodiments of the invention, the mRNA fold change for TAS2R38 in HuTu-80 cells, siRNA control, and receptor siRNA.
Figure 7:
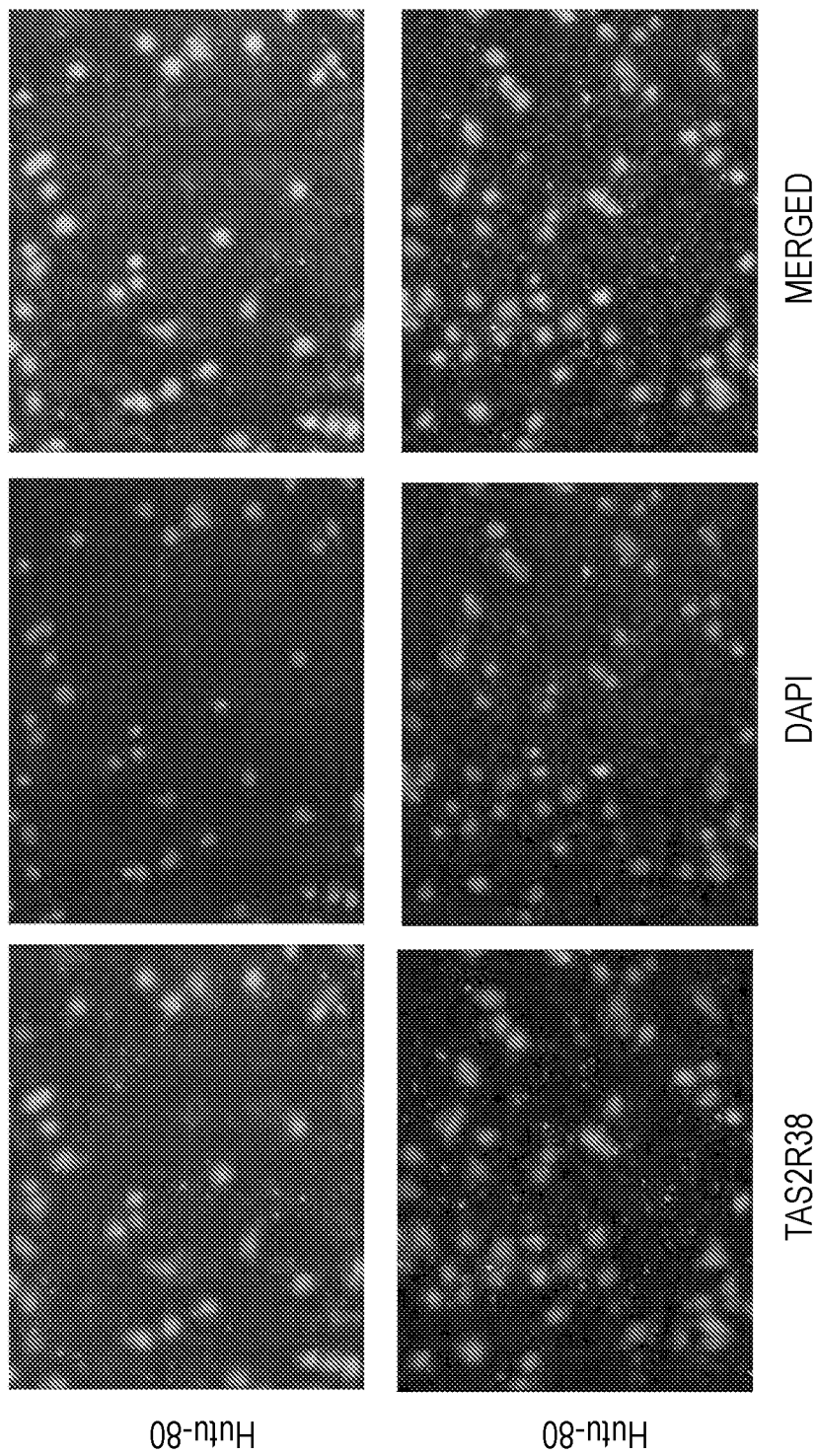
FIG. 7A-FIG. 7B depict in accordance with various embodiments of the invention, TAS2R38 is expressed in most HuTu-80s. Human duodenal epithelial cancer cells HuTu-80 (Cat. HTB-40, ATCC, Manassas, VA) were seed in 4-well chamber slides (Nunc, Thermo Fisher Scientific, Rochester, NY) coated with poly-L-lysine (Sigma, St. Louis, MO). Confluent cells were fixed with 4% paraformaldehyde (Sigma) for 30 min, washed 3X with PBS (Sigma), permeabilized with 0.25% triton X-100 in PBS for 10 min, washed 3X with PBS and blocked for 2 hr with 5% BSA in PBS. Fixed cells were incubated overnight with FIG. 7A 1:150 or (B) FIG. 7B 1:250 concentration of rabbit TAS2R38 antibody (ab65509, Abcam, Cambridge, MA). Cells were washed 3X with PBS and incubated with 1:400 secondary Alexa Fluor 488 goat-anti-rabbit IgG antibody overnight, washed 3X with PBS and counterstained with mounting media containing DAPI (Vector Labs, Burlingame, CA). Fluorescent green (TAS38R) and blue (DAPI) were visualized on a Nikon Eclipse Ti-U microscope using proprietary Elements software (Nikon, Melville, NY).
Figure 8:
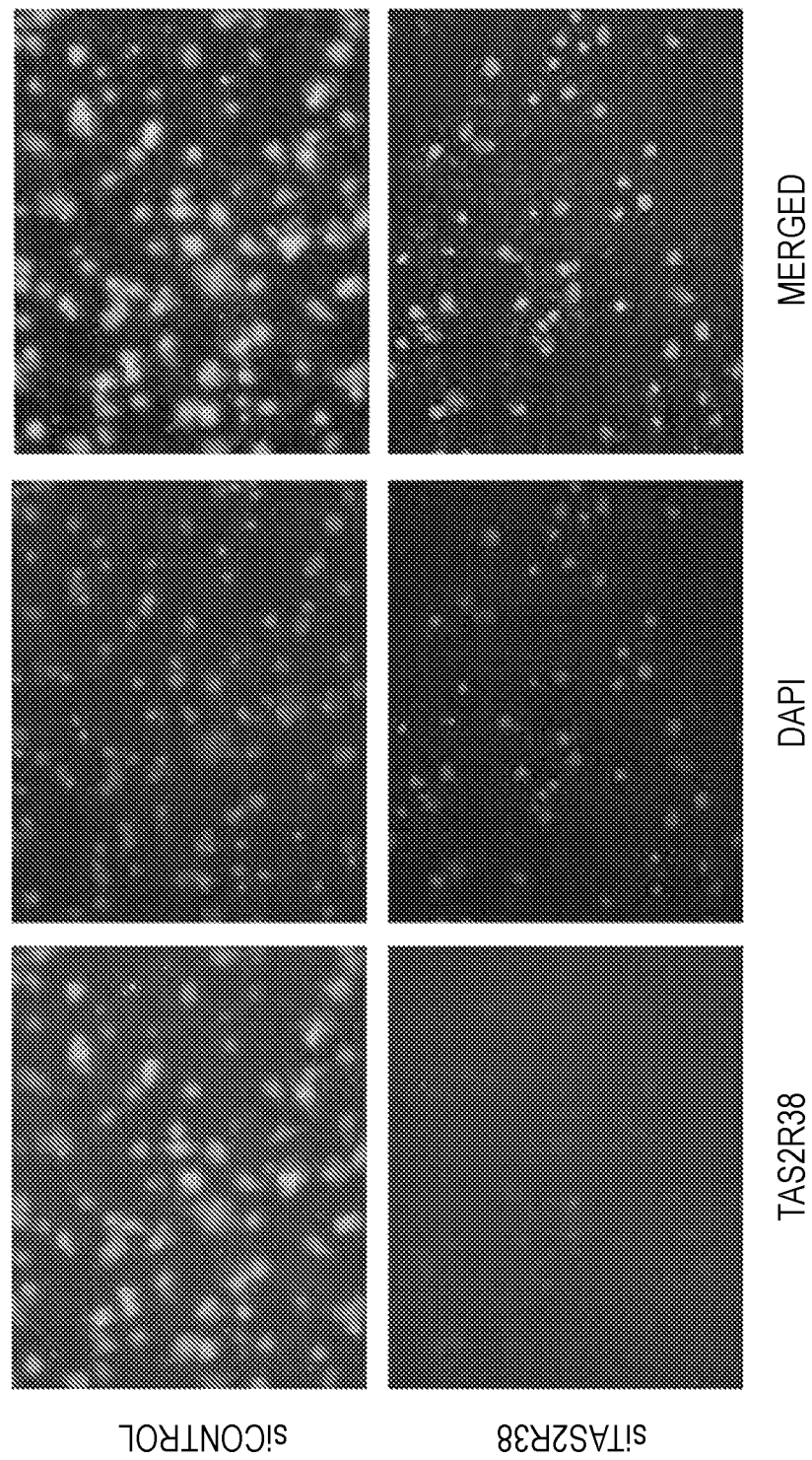
FIG. 8 depicts in accordance with various embodiments of the invention, siTAS2R38 knock-down in most HuTu-80s. Human duodenal epithelial cancer cells HuTu-80 (Cat. HTB-40, ATCC, Manassas, VA) were transfected with control siRNA or TAS2R38 siRNA (Qiagen, Valencia, CA) by nucleoporation (Lonza, Walkersville, MD). These transfected HuTu-80 cells were seeded in 4-well chamber slides (Nunc, Thermo Fisher Scientific, Rochester, NY) coated with poly-L-lysine (Sigma, St. Louis, MO). Confluent cells were fixed with 4% paraformaldehyde (Sigma) for 30 min, washed 3X with PBS (Sigma), permeabilized with 0.25% triton X-100 in PBS for 10 min, washed 3X with PBS and blocked for 2 hr with 5% BSA in PBS. Fixed cells were incubated overnight with 1:250 concentration of rabbit TAS2R38 antibody (ab65509, Abcam, Cambridge, MA). The cells were washed 3X with PBS and incubated with 1:400 secondary Alexa Fluor 488 goat-anti-rabbit IgG antibody overnight, washed 3X with PBS and counterstained with mounting media containing DAPI (Vector Labs, Burlingame, CA). Fluorescent green (TAS38R) and blue (DAPI) were visualized and captured on a Nikon Eclipse Ti-U microscope using proprietary Elements software (Nikon, Melville, NY).

The dose-response study of the effect of PTU and Z7 on GLP-1 release using wild-type and TAS2R38 knockout HuTu-80 cells was carried out. As shown in FIG. 5, PTU caused GLP-1 release which was right-shifted in cells with knock down for TAS2R38. FIGS. 6, 7, and 8 show the receptor expression and knockdown in HuTu-80 cells using a TAS2R38 receptor siRNA. These results strongly suggest that PTU ligand interacts with this receptor. The fact that greater concentrations of the ligands were able to cause GLP-1 release with decreased receptor expression indicates that either these ligands also interact with other receptors to cause GLP-1 release or that only a small fraction of receptors are necessary for provide a full response. These preliminary data also suggest that HuTu-80 cell's GLP-1 release is sensitive and specific to some bitter ligands making these cells ideal models for a fast screening of new compounds.

ligands, PTC and compounds predicted to interact with TAS2R38 by computer modeling.

Figure 9A:
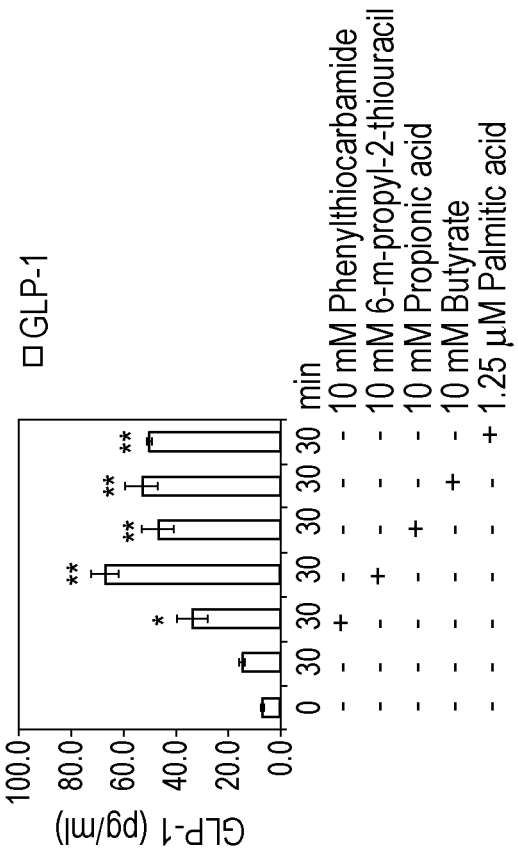
FIG. 9A Stimulation with pomegranate ellagitannin metabolites and loquat extract TP ingredients.

We tested the ability of botanical signals to promote GLP-1 release. Results in FIG. 9A demonstrate that pomegranate derived ellagitannin metabolites urolithin A and ellagic acid or loquat triterpenoid constituent ursolic acid and oleanolic acid cause significant increases in GLP-1 over the basal release in 30 min.

Figure 9B:
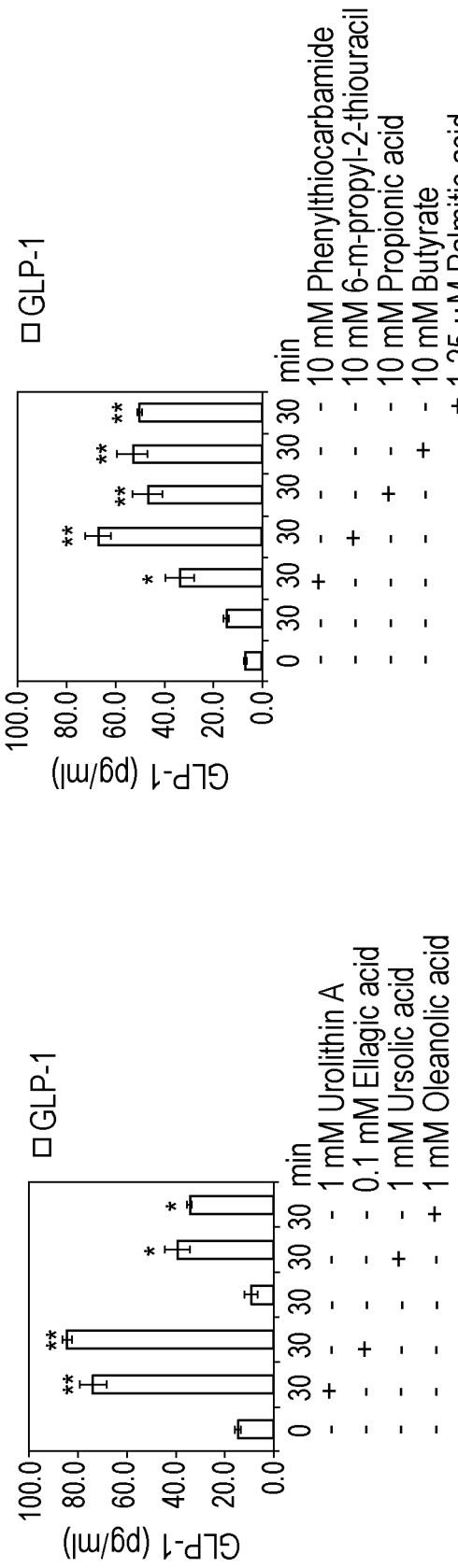
FIG. 9B Activation of FFAR by short-chain and long-chain free fatty acids. HuTu-80 cells were untreated (zero-time) or treated with vehicle and various phytochemicals at indicated concentrations for 30 min. Conditioned media were collected and frozen until GLP-1 measurement as described below in Method. Values are mean±SE, N=3, *P<0.05, **P<0.01

Furthermore, FIG. 9B shows that both short chain fatty acids propionate and butyrate, or long-chain palmitic acid stimulate GLP-1 release comparable to that by TAS2R38 ligands PTC and PTU (10 mM). For these experiments we picked a concentration for measurable effect.

Figure 10:
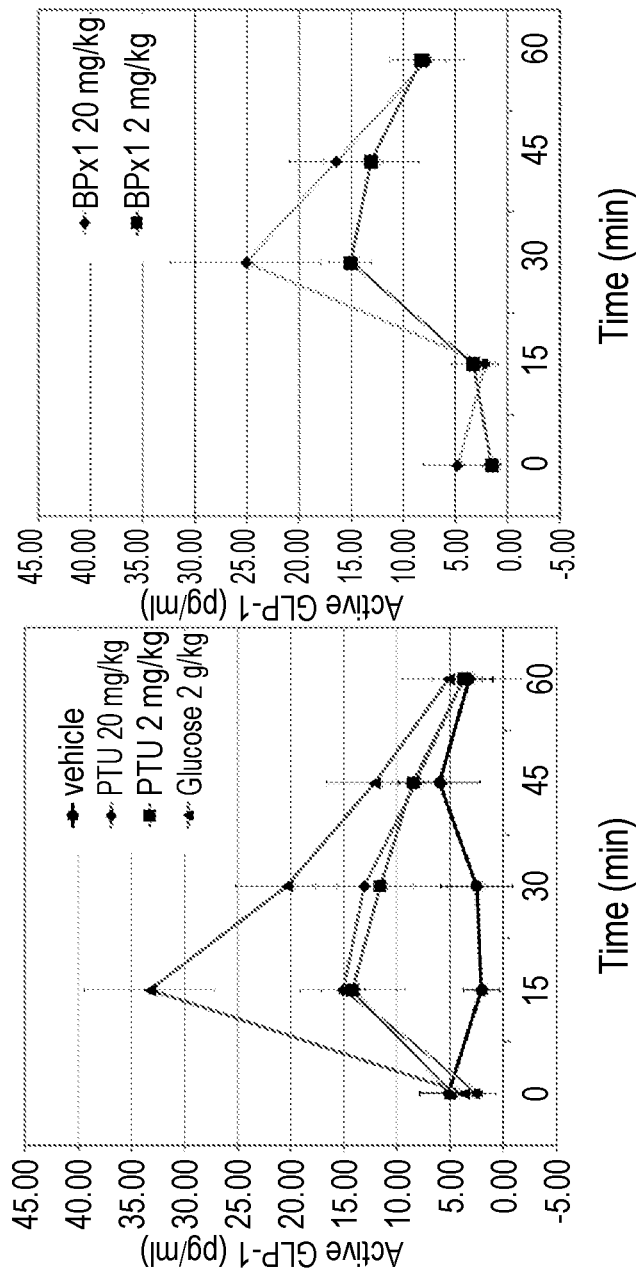
FIG. 10 depicts in accordance with various embodiments of the invention, in vivo GLP-1 release in healthy mice upon administration of BPx1 bitter oligopeptide at two concentrations.

The left panel of FIG. 10 shows GLP-1 responses in healthy mice after the administration of glucose and different doses of PTU molecule that is a ligand for the TAS2R38 receptor. The right panel of FIG. 10 shows the GLP-1 responses in healthy mice after the administration of two different doses of the bitter peptide BPx1.

FIG. 11 shows stimulation of GLP-1 release by the Bitter Peptide BPx1 (FIG. 11A) and scrambled PolyAla peptide Ala-Ala-Ala-Ala (FIG. 11B) in cultured HuTu-80 cells, which were untreated (siCONTROL) or treated with TAS2R38 siRNA vehicle (siTAS2R38) and indicated concentrations for 30 min. Conditioned media were collected and frozen until GLP-1 measurement. Values are mean±SD, N=3. GLP-1 is measured using Luminex assay. The data shows that the bitter peptide effect on GLP-1 release is predominantly through TAS2R38. Also, a scrambled peptide like PolyAla is in effective at causing GLP-1 release. These data indicate that GLP-1 release is specific to BPx1.

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still further variations and alternate elements will be apparent to one of skill in the art. Among these variations, without limitation, are oligopeptide designs, receptor modulated by such oligopeptides, methods of administering such compositions and treatments associated therein, including the particular use of the products created through the teachings of the invention. Various embodiments of the invention can specifically include or exclude any of these variations or elements.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

In some embodiments, the terms "a" and "an" and "the" and similar references used in the context of describing a particular embodiment of the invention (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of this invention are described herein, including the best mode known to the inventors for carrying out the invention. Variations on those preferred embodiments will become apparent to those of ordinary skill in the art upon reading the foregoing description. It is contemplated that skilled artisans can employ such variations as appropriate, and the invention can be practiced otherwise than specifically described herein. Accordingly, many embodiments of this invention include all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the above cited references and printed publications are herein individually incorporated by reference in their entirety.

It is to be understood that the embodiments of the invention disclosed herein are illustrative of the principles of the present invention. Other modifications that can be employed can be within the scope of the invention. Thus, by way of example, but not of limitation, alternative configurations of the present invention can be utilized in accordance with the teachings herein. Accordingly, embodiments of the present invention are not limited to that precisely as shown and described.

The invention claimed is:

1. A method of treating type 2 diabetes mellitus in a subject having type 2 diabetes, the method comprising: administering an effective amount of one or more bitter oligopeptides targeting receptors comprising taste receptor 2 member 38 (TAS2R38) in a controlled or extended release dosage form, releasing the one or more bitter oligopeptides into a small intestine and/or large intestine of the subject in need thereof, and increasing release of gut hormone comprising glucagon-like peptide-1 (GLP-1) from the small intestine and/or large intestine, wherein the one or more bitter oligopeptides comprises the tripeptide LLF (SEQ ID NO: 4), and wherein the controlled or extended release dosage form further comprises an agent to provide slow or controlled release of the one or more bitter oligopeptides, and/or an agent to increase intestinal retention.

2. The method of claim 1, wherein the one or more bitter oligopeptides further comprise YGLF (SEQ ID NO:1), YPFPGPIPN (SEQ ID NO:2), IPAVF (SEQ ID NO:3), or a combination thereof.

3. The method of claim 1, wherein the one or more bitter oligopeptides are each conjugated to the agent to increase intestinal retention, wherein the agent to increase intestinal retention comprises cellulose.

4. The method of claim 1, further comprising administering a fatty acid or botanical molecule derived from food that increases gut hormone release.

5. The method of claim 4, wherein the fatty acid or botanical molecule derived from food is any one or more of urolithin A, ellagic acid, ursolic acid, oleanolic acid, 6-m-propyl-2-thiouracil, propionic acid, butyrate, and palmitic acid.

6. The method of claim 1, wherein the gut hormone further comprises peptide tyrosine-tyrosine (PYY) or a combination of GLP-1 and PYY, wherein the GLP-1 comprises GLP-1-(7-37), GLP-1-(7-36)NH2, or both.

7. The method of claim 1, wherein the increase in gut hormone release is mediated by the targeted receptors, and the targeted receptors are expressed on the surface of an endocrine L-cell.

8. The method of claim 1, wherein the one or more bitter oligopeptides are administered orally or enterally to the small intestine.

9. The method of claim 1, wherein the subject is human.

10. The method of claim 1, further comprising administering sodium glucose co-transporter 2 (SGLT2) inhibitors, insulin, inhaled insulin, sulfonyl ureas, inhibitors of dipeptidyl peptidase-4, metformin, acarbose, thiazolidinediones or a combination thereof.

11. The method of claim 1, wherein the effective amount is about 0.1 to 0.5 mg/kg/day, 0.5 to 5 mg/kg/day, 5 to 10 mg/kg/day, 10 to 20 mg/kg/day, 20 to 50 mg/kg/day, 50 to 100 mg/kg/day, 100 to 200 mg/kg/day, 200 to 300 mg/kg/day, 300 to 400 mg/kg/day, 400 to 500 mg/kg/day, 500 to 600 mg/kg/day, 600 to 700 mg/kg/day, 700 to 800 mg/kg/day, 800 to 900 mg/kg/day or 900 to 1000 mg/kg/day.

12. The method of claim 1, wherein the one or more bitter oligopeptides are administered to the subject 1-3 times per day or 1-7 times per week.

13. The method of claim 1, wherein the one or more bitter oligopeptides are administered to the subject for 1-5 days, 1-5 weeks, 1-5 months, or 1-5 years.

14. The method of claim 4, wherein the one or more bitter oligopeptides and the fatty acid or botanical molecule derived from food are administered sequentially.

15. The method of claim 1, wherein the one or more bitter oligopeptides are administered to the colon by rectal suppository or enema.

16. The method of claim 1, wherein the one or more bitter oligopeptides are administrated to the subject at least as the subject develops the type 2 diabetes.

17. The method of claim 1, wherein the one or more bitter oligopeptides are administrated to the subject at least after the subject develops the type 2 diabetes.

18. The method of claim 4, wherein the one or more bitter oligopeptides and the fatty acid or botanical molecule derived from food are administered simultaneously.

19. The method of claim 1, wherein the one or more bitter oligopeptides are further comprise IPAVF (SEQ ID NO:3) and one or both of YGLF (SEQ ID NO:1) and YPFPGPIPN (SEQ ID NO:2).

20. The method of claim 1, wherein the controlled or extended release dosage form comprises the agent to provide slow or controlled release, which comprises hydroxypropylmethyl cellulose or is in a form of a polymer matrix, a gel, or a multilayer coating, or wherein the controlled or extended release dosage form comprises microparticles, liposomes, microspheres, or a combination thereof.

21. The method of claim 1, wherein the one or more bitter oligopeptides comprise a non-naturally occurring amino acid, or the one or more bitter oligopeptides are D-isomer peptides containing one or more D-amino acids, so as to be resistant to degradation by endogenous peptidases or proteases.

22. A method of treating type 2 diabetes mellitus in a subject having type 2 diabetes, the method comprising: administering an effective amount of one or more bitter oligopeptides targeting receptors comprising taste receptor 2 member 38 (TAS2R38) to the subject and increasing gut hormone release from a small intestine and/or a large intestine of the subject, wherein the one or more bitter oligopeptides are conjugated to cellulose, said one or more bitter oligopeptides conjugated to cellulose being IPAVF (SEQ ID NO:3) conjugated to cellulose, LLF (SEQ ID NO:4) conjugated to cellulose, YGLF (SEQ ID NO:1) conjugated to cellulose, YPFPGPIPN (SEQ ID NO:2) conjugated to cellulose, or a mixture thereof.

23. A method of treating type 2 diabetes mellitus in a subject having type 2 diabetes, the method comprising: administering an effective amount of one or more bitter oligopeptides to the human subject's colon by rectal suppository or enema, releasing the one or more bitter oligopeptides in a large intestine of the subject to target taste receptor 2 member 38 (TAS2R38) therein, and increasing glucagon-like peptide-1 (GLP-1) release from the large intestine, wherein the one or more bitter oligopeptides are IPAVF (SEQ ID NO:3), LLF (SEQ ID NO:4), YGLF (SEQ ID NO: 1), YPFPGPIPN (SEQ ID NO:2), or a mixture thereof.

* * * * *

```
                         SEQUENCE LISTING

<160> NUMBER OF SEQ ID NOS: 15

<210> SEQ ID NO 1
<211> LENGTH: 4
<212> TYPE: PRT
<213> ORGANISM: Artificial Sequence
<220> FEATURE:
<223> OTHER INFORMATION: peptide

<400> SEQUENCE: 1

Tyr Gly Leu Phe
1

<210> SEQ ID NO 2
<211> LENGTH: 9
<212> TYPE: PRT
<213> ORGANISM: Artificial Sequence
<220> FEATURE:
<223> OTHER INFORMATION: peptide

<400> SEQUENCE: 2

Tyr Pro Phe Pro Gly Pro Ile Pro Asn
1               5

<210> SEQ ID NO 3
<211> LENGTH: 5
<212> TYPE: PRT
<213> ORGANISM: Artificial Sequence
<220> FEATURE:
<223> OTHER INFORMATION: peptide

<400> SEQUENCE: 3

Ile Pro Ala Val Phe
1               5

<210> SEQ ID NO 4
<211> LENGTH: 3
<212> TYPE: PRT
<213> ORGANISM: Artificial Sequence
<220> FEATURE:
<223> OTHER INFORMATION: peptide

<400> SEQUENCE: 4

Leu Leu Phe
1

<210> SEQ ID NO 5
<211> LENGTH: 7
<212> TYPE: PRT
<213> ORGANISM: Artificial Sequence
<220> FEATURE:
<223> OTHER INFORMATION: peptide

<400> SEQUENCE: 5

Pro Lys Lys Lys Arg Lys Val
1               5

<210> SEQ ID NO 6
<211> LENGTH: 16
<212> TYPE: PRT
<213> ORGANISM: Artificial Sequence
<220> FEATURE:
<223> OTHER INFORMATION: peptide
```

```
<400> SEQUENCE: 6

Lys Arg Pro Ala Ala Thr Lys Lys Ala Gly Gln Ala Lys Lys Lys
1               5                   10                  15

<210> SEQ ID NO 7
<211> LENGTH: 6
<212> TYPE: PRT
<213> ORGANISM: Artificial Sequence
<220> FEATURE:
<223> OTHER INFORMATION: peptide
<220> FEATURE:
<221> NAME/KEY: misc_feature
<222> LOCATION: (4)..(4)
<223> OTHER INFORMATION: Xaa can be any naturally occurring amino acid

<400> SEQUENCE: 7

Lys Lys Arg Xaa Lys Arg
1               5

<210> SEQ ID NO 8
<211> LENGTH: 4
<212> TYPE: PRT
<213> ORGANISM: Artificial Sequence
<220> FEATURE:
<223> OTHER INFORMATION: peptide
<220> FEATURE:
<221> NAME/KEY: misc_feature
<222> LOCATION: (3)..(3)
<223> OTHER INFORMATION: Xaa can be any naturally occurring amino acid

<400> SEQUENCE: 8

Lys Lys Xaa Arg
1

<210> SEQ ID NO 9
<211> LENGTH: 4
<212> TYPE: PRT
<213> ORGANISM: Artificial Sequence
<220> FEATURE:
<223> OTHER INFORMATION: peptide
<220> FEATURE:
<221> NAME/KEY: misc_feature
<222> LOCATION: (3)..(3)
<223> OTHER INFORMATION: Xaa can be any naturally occurring amino acid

<400> SEQUENCE: 9

Lys Lys Xaa Lys
1

<210> SEQ ID NO 10
<211> LENGTH: 4
<212> TYPE: PRT
<213> ORGANISM: Artificial Sequence
<220> FEATURE:
<223> OTHER INFORMATION: peptide
<220> FEATURE:
<221> NAME/KEY: misc_feature
<222> LOCATION: (3)..(3)
<223> OTHER INFORMATION: Xaa can be any naturally occurring amino acid

<400> SEQUENCE: 10

Lys Arg Xaa Lys
1

<210> SEQ ID NO 11
<211> LENGTH: 4
<212> TYPE: PRT
<213> ORGANISM: Artificial Sequence
```

```
<220> FEATURE:
<223> OTHER INFORMATION: peptide
<220> FEATURE:
<221> NAME/KEY: misc_feature
<222> LOCATION: (3)..(3)
<223> OTHER INFORMATION: Xaa can be any naturally occurring amino acid

<400> SEQUENCE: 11

Lys Arg Xaa Arg
1

<210> SEQ ID NO 12
<211> LENGTH: 18
<212> TYPE: PRT
<213> ORGANISM: Artificial Sequence
<220> FEATURE:
<223> OTHER INFORMATION: peptide

<400> SEQUENCE: 12

Met Lys Trp Val Thr Phe Ile Ser Leu Leu Phe Leu Phe Ser Ser Ala
1               5                   10                  15

Tyr Ser

<210> SEQ ID NO 13
<211> LENGTH: 18
<212> TYPE: PRT
<213> ORGANISM: Artificial Sequence
<220> FEATURE:
<223> OTHER INFORMATION: peptide

<400> SEQUENCE: 13

Met Ala Phe Leu Trp Leu Leu Ser Cys Trp Ala Leu Leu Gly Thr Thr
1               5                   10                  15

Gly Phe

<210> SEQ ID NO 14
<211> LENGTH: 14
<212> TYPE: PRT
<213> ORGANISM: Artificial Sequence
<220> FEATURE:
<223> OTHER INFORMATION: peptide

<400> SEQUENCE: 14

Met Gln Leu Leu Ser Cys Ile Ala Leu Ile Leu Ala Leu Val
1               5                   10

<210> SEQ ID NO 15
<211> LENGTH: 15
<212> TYPE: PRT
<213> ORGANISM: Artificial Sequence
<220> FEATURE:
<223> OTHER INFORMATION: peptide

<400> SEQUENCE: 15

Met Asn Leu Leu Leu Ile Leu Thr Phe Val Ala Ala Ala Val Ala
1               5                   10                  15
```